United States Patent
Lomerson, Sr. et al.

(10) Patent No.: US 8,125,097 B1
(45) Date of Patent: Feb. 28, 2012

(54) ELECTRICAL GENERATION USING VERTICAL MOVEMENT OF A MASS

(76) Inventors: Robert B. Lomerson, Sr., Fort Worth, TX (US); Robert B. Lomerson, Jr., Bedford, TX (US)

( * ) Notice: Subject to any disclaimer, the term of this patent is extended or adjusted under 35 U.S.C. 154(b) by 208 days.

(21) Appl. No.: 12/538,611

(22) Filed: Aug. 10, 2009

(51) Int. Cl.
*F03B 13/10* (2006.01)
(52) U.S. Cl. .............................. 290/53; 60/497
(58) Field of Classification Search .......... 290/42, 290/43, 44, 53, 54, 55; 60/497
See application file for complete search history.

(56) References Cited

U.S. PATENT DOCUMENTS

| | | |
|---|---|---|
| 163,451 A | 5/1875 | Buckner |
| 559,969 A | 5/1896 | Delmonte |
| 596,124 A | 12/1897 | Pyle |
| 597,766 A | 1/1898 | Furbish |
| 639,734 A | 12/1899 | Johnson |
| 884,080 A | 4/1908 | Fallis |
| 896,572 A | 8/1908 | Pepper |
| 974,282 A | 11/1910 | Brum |
| 987,685 A | 3/1911 | Atkinson |
| 1,004,332 A | 9/1911 | Allen |
| 1,035,049 A | 8/1912 | Read |
| 1,048,389 A | 12/1912 | Braunsdorf |
| 1,061,061 A | 5/1913 | Frame |
| 1,066,396 A | 7/1913 | Frame |
| 1,083,794 A | 1/1914 | Braunsdorf |
| 1,089,120 A | 3/1914 | Erickson |
| 1,105,249 A | 7/1914 | Bustos |
| 1,177,053 A | 3/1916 | Priestley |
| 1,276,112 A | 8/1918 | Reed |
| 1,376,140 A | 4/1921 | Ervin |
| 1,403,702 A | 1/1922 | Melvin |
| 1,471,222 A | 10/1923 | Taylor |
| 1,482,713 A | 2/1924 | Stein |
| 1,693,125 A | 11/1928 | Van Epps |
| 1,799,848 A | 4/1931 | Hansen |
| 1,816,044 A | 7/1931 | Gallagher |
| 1,818,066 A | 8/1931 | Jouy |
| 1,864,499 A | 6/1932 | Grigsby |
| 1,970,722 A | 11/1933 | Withers et al. |
| 2,749,085 A | 6/1956 | Searcy |
| 2,855,851 A | 10/1958 | Shumen |
| 3,664,125 A | 5/1972 | Strange |
| 3,928,771 A | 12/1975 | Straumsnes |

(Continued)

FOREIGN PATENT DOCUMENTS

GB 2039330 A 8/1980

(Continued)

*Primary Examiner* — Nicholas Ponomarenko
(74) *Attorney, Agent, or Firm* — Geoffrey A. Mantooth

(57) ABSTRACT

A power generator has a mass that is capable of moving vertically up and down. A generator has a rotor and a stator. A shaft couples the mass to the rotor, with the shaft allowing the mass to move vertically up and down. The shaft has spirals that produce relative rotation between the shaft and the rotor. The mass can float on a body of water that is subject to fluctuating water levels, such as a tidal body or a lock, or the mass can be used on dry land. The mass has an interior cavity. When the cavity contains gas, the mass rises in the water. When the cavity contains water, the mass sinks in the water. When the mass has sunk, gas is introduced into the cavity. When the mass has risen, the gas is vented from the cavity.

22 Claims, 16 Drawing Sheets

U.S. PATENT DOCUMENTS

| | | | | |
|---|---|---|---|---|
| 3,930,168 A | * | 12/1975 | Tornabene | 290/53 |
| 3,959,663 A | * | 5/1976 | Rusby | 290/53 |
| 4,034,565 A | | 7/1977 | McVeigh | |
| 4,184,335 A | * | 1/1980 | Byrne | 60/496 |
| 4,184,336 A | | 1/1980 | Lamberti | |
| 4,196,591 A | | 4/1980 | Wallace | |
| 4,208,878 A | | 6/1980 | Rainey | |
| 4,218,192 A | | 8/1980 | West | |
| 4,241,283 A | | 12/1980 | Storer, Sr. | |
| 4,305,003 A | | 12/1981 | Basurto | |
| 4,434,375 A | | 2/1984 | Taylor | |
| 4,443,707 A | | 4/1984 | Scieri | |
| 4,455,824 A | | 6/1984 | Dabringhaus | |
| 4,464,080 A | | 8/1984 | Gorlov | |
| 4,475,334 A | | 10/1984 | Kuwabara | |
| 4,476,396 A | | 10/1984 | Calvert, Jr. | |
| 4,540,313 A | | 9/1985 | Broome | |
| 4,594,853 A | | 6/1986 | Raichlen | |
| 4,599,858 A | * | 7/1986 | La Stella et al. | 60/497 |
| 4,603,551 A | | 8/1986 | Wood | |
| 4,627,240 A | | 12/1986 | Holmes | |
| 4,674,279 A | | 6/1987 | Ali et al. | |
| 4,698,969 A | | 10/1987 | Raichlen | |
| 5,186,822 A | | 2/1993 | Tzong et al. | |
| 5,929,531 A | | 7/1999 | Lagno | |
| 6,000,880 A | | 12/1999 | Halus | |
| 6,275,570 B1 | | 8/2001 | Homan | |
| 6,800,954 B1 | | 10/2004 | Meano | |
| 6,812,588 B1 | | 11/2004 | Zadig | |
| 6,863,806 B2 | | 3/2005 | Stark et al. | |
| 7,075,190 B1 | | 7/2006 | Lomerson et al. | |
| 7,078,827 B2 | | 7/2006 | Brewington | |
| 7,084,521 B1 | | 8/2006 | Martin | |
| 7,199,483 B2 | | 4/2007 | Lomerson et al. | |
| 7,432,612 B2 | | 10/2008 | Lomerson et al. | |
| 2008/0309088 A1 | | 12/2008 | Agamloh et al. | |
| 2010/0109329 A1 | * | 5/2010 | Brantingham | 290/53 |

FOREIGN PATENT DOCUMENTS

| | | |
|---|---|---|
| GB | 2394514 A | 4/2004 |
| GB | 2407345 A | 4/2005 |
| JP | 62228672 A | 10/1987 |
| JP | 10274145 A | 10/1998 |
| WO | WO 02092919 A1 | 11/2002 |

* cited by examiner

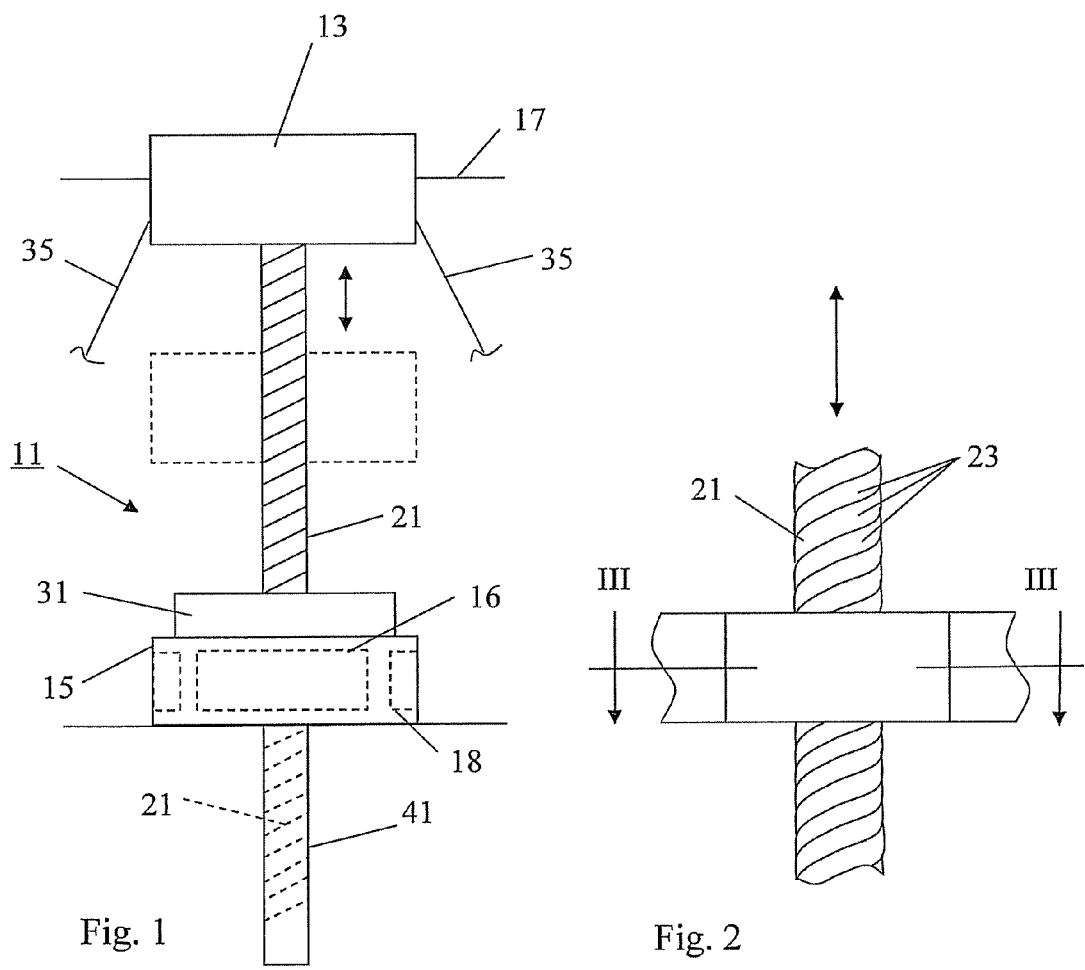
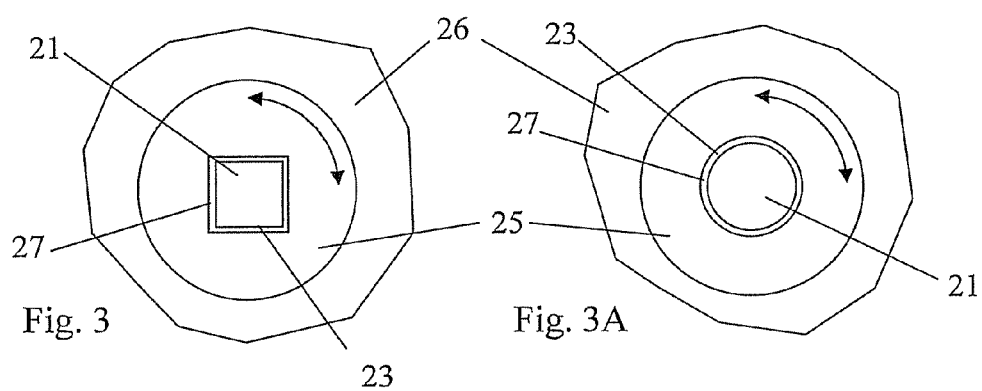
Fig. 1    Fig. 2
Fig. 3    Fig. 3A

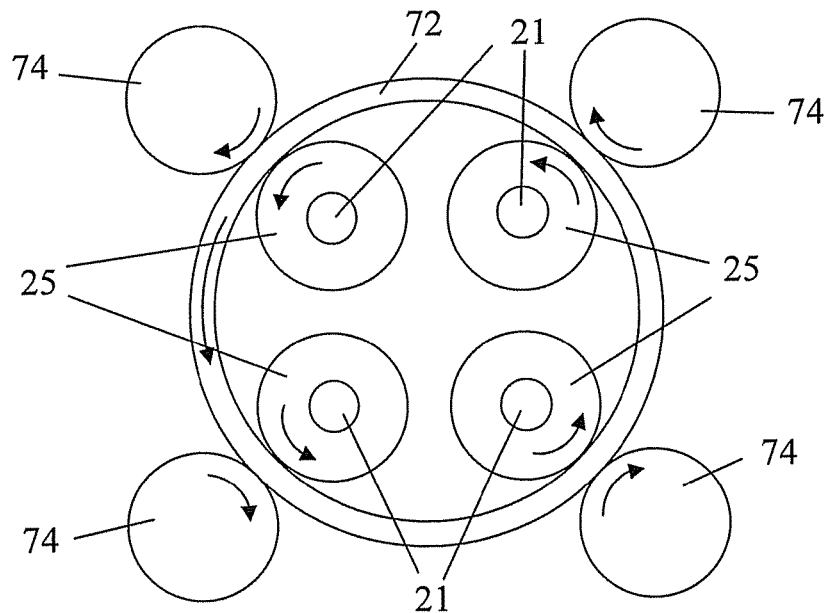
Fig. 9C
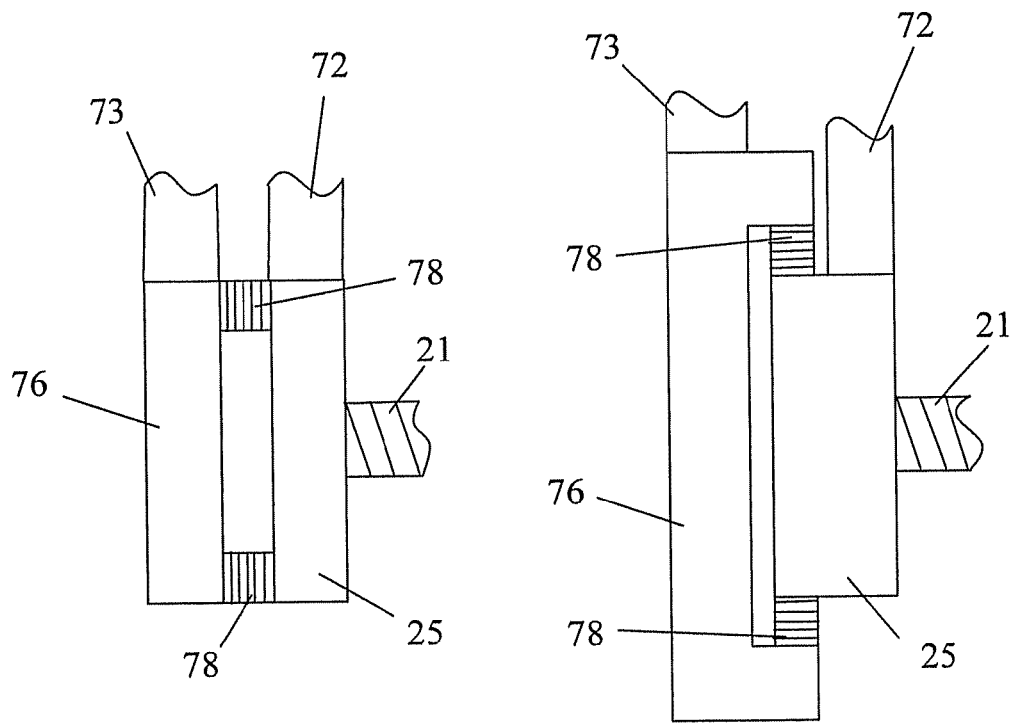
Fig. 9D
Fig. 9E

ELECTRICAL GENERATION USING VERTICAL MOVEMENT OF A MASS

FIELD OF THE INVENTION

The present invention relates to producing electrical energy from a mass that rises and falls.

BACKGROUND OF THE INVENTION

Tides contain significant amount of energy. As a tide comes into shore, the water level rises. Conversely, the water level falls as the tide goes out. This rising and falling of the water level can be harnessed to produce electrical power.

We are the inventors of several earlier patents, namely U.S. Pat. Nos. 7,075,190 and 7,199,483, which discuss the use of vessel hulls to extract energy from the tides and other bodies of water. The vessel hull is used with pistons and cylinders; as the vessel hull moves up and down, the pistons and cylinders produce pressurized fluid, which fluid is then used to drive a turbine. The turbine in turn drives an electrical generator.

This invention uses the vertical motion of a vessel hull or other mass to directly drive an electrical generator.

In addition, this invention creates vertical motion without tidal action by changing the buoyancy of the mass.

SUMMARY OF THE INVENTION

The present invention provides a power generator that comprises a mass. The mass is capable of moving vertically up and down. A generator has a rotor and a stator. A shaft has a spiral along the length of the shaft. The mass moves relative to either the shaft or the generator. The vertical movement of the mass causes the shaft to impart rotational movement to the rotor.

In accordance with one aspect of the present invention a transmission engages the shaft and the generator rotor.

In accordance with another aspect of the present invention the mass floats on a body of water, which body of water has a fluctuating water level.

In accordance with still another aspect of the present invention the body of water is tidal.

In accordance with still another aspect of the present invention the body of water is contained in a lock.

In accordance with still another aspect of the present invention the mass moves up and down on waves.

In accordance with another aspect of the present invention the power generator further comprises a harborage located in a body of water, with the mass located in the harborage.

In accordance with still another aspect of the present invention the harborage has at least one port for allowing water to ingress and egress the harborage. The port has a valve for controlling the flow of water into and out of the harborage.

In accordance with still another aspect of the present invention the mass is dry.

In accordance with still another aspect of the present invention the generator rotor is rotated as the shaft moves in one direction.

In accordance with still another aspect of the present invention the generator rotor is rotated as the shaft moves in both directions.

In accordance with still another aspect of the present invention the shaft has spirals of constant pitch.

In accordance with another aspect of the present invention the shaft has spirals of decreased pitch that coupled to the rotor when the mass changes vertical direction.

In accordance with still another aspect of the present invention a flywheel is rotated as the shaft moves longitudinally. The flywheel rotates the generator rotor.

In accordance with still another aspect of the present invention, the mass and the shaft move relative to the generator.

In accordance with still another aspect of the present invention, the mass and the generator move relative to the shaft.

In accordance with still another aspect of the present invention, the mass moves relative to the shaft and the generator.

The present invention also provides a power generator that comprises a mass that is capable of moving vertically up and down in a column of liquid. The mass has an interior cavity that receives some of the liquid to become negatively buoyant in the column of liquid and receives gas to become positively buoyant in the column of liquid. When the mass is of negative buoyancy, the mass sinks in the column of liquid, and when the mass has positive buoyancy, the mass rises in the column of liquid. A gas source intermittently provides gas to the mass cavity. A linear-to-rotary converter converts the vertical movement of the mass into rotational movement. A generator has a rotor and a stator, with the rotor rotated by the linear-to-rotary converter.

In accordance with one aspect of the present invention, the mass has a valve that allows communication between the mass cavity and an exterior of the mass. The valve allows gas in the cavity to exit the mass.

In accordance with still another aspect of the present invention, the valve comprises a cap capable of opening and closing. The opened cap presents minimal drag as the mass sinks.

In accordance with still another aspect of the present invention, the mass has a cap capable of opening and closing. The opened cap allows gas to escape the cavity and the closed cap retains the gas in the cavity.

In accordance with still another aspect of the present invention, the gas source comprises a pipe with compressed gas, the pipe communicating with the mass cavity.

In accordance with another aspect of the present invention, the gas source comprises a gas generating agent and an igniter.

In accordance with still another aspect of the present invention, the power generator further comprises an inflation station located at a bottom position from the mass. The inflation station displaces liquid from the mass cavity when the mass is in a bottom position in the column of liquid. The inflation station provides gas to the mass cavity.

In accordance with still another aspect of the present invention, the power generator further comprises a tower for containing the column of liquid. The tower is located on land.

In accordance with still another aspect of the present invention, the column of liquid comprises a water body.

In accordance with still another aspect of the present invention, the power generator further comprises a gas recapture tank that is coupled to the mass cavity by a hose. A valve regulates the flow of gas between the mass cavity and the tank.

In accordance with still another aspect of the present invention, the linear-to-rotary converter comprises a spiral shaft.

The present invention also provides a power generator that comprises a mass that is capable of moving vertically up and down in a column of liquid. A gas source is located in the column of liquid below the mass. The gas source releases gas into the column of liquid so as to form a liquid-gas region, which liquid-gas region has a lower density than the liquid. The mass is positively buoyant in the liquid and negatively buoyant in the liquid-gas region. A valve on the gas source regulates the flow of gas into the column of liquid. A linear-to-rotary converter converts the vertical movement of the mass into rotational movement. A generator has a rotor and a stator, with the rotor being rotated by the linear-to-rotary converter.

In accordance with one aspect of the present invention, the gas source comprises a gas well.

In accordance with still another aspect of the present invention, the linear-to-rotary converter comprises a spiral shaft.

The present invention also provides a power generator that comprises a tower that has an interior. A mass is capable of moving up and down in the tower interior. The mass has an interior cavity and a valved drain from the cavity to an exterior of the mass. The mass is positively buoyant when the tower contains liquid and the mass cavity contains gas and the mass is negatively buoyant when the tower contains gas and the mass cavity contains liquid. A liquid reservoir is provided. A tower inlet is provided from the liquid reservoir to the tower interior. A valve in the tower inlet regulates the flow of liquid from the liquid reservoir. The tower has a drain. A linear-to-rotary converter converts the vertical movement of the mass into rotational movement. A generator has a rotor and a stator with the rotor rotated by the linear-to-rotary converter.

In accordance with one aspect of the present invention the linear-to-rotary converter further comprises a shaft having a spiral along the length of the shaft. The shaft is moved longitudinally as the mass moves up and down. The spiral is used to rotate the generator rotor.

In accordance with still another aspect of the present invention the mass cavity is capable of containing liquid to make the mass negatively buoyant when the tower interior contains gas. The power generator further comprises a mass inlet that provides communication from the liquid reservoir to the mass cavity. There is a mass inlet valve that regulates the flow of liquid from the liquid reservoir into the mass cavity.

BRIEF DESCRIPTION OF THE DRAWINGS

FIG. 1 is an elevational view of the system in the present invention, in accordance with a preferred embodiment.

FIG. 2 is an elevational detailed view of the spiral post or shaft and rotor.

FIG. 3 is a cross-sectional view, taken through lines of FIG. 2.

FIG. 3A is a cross-sectional view of the same orientation of FIG. 3 showing the spiral shaft and rotor in accordance with another embodiment.

FIG. 9A shows an elevational view. FIG. 9B shows a top view.

FIG. 9C shows the flywheel in accordance with another embodiment.

FIG. 9D shows the spiral shaft in accordance with another embodiment.

FIG. 9E shows the spiral shaft in accordance with still another embodiment.

DESCRIPTION OF THE PREFERRED EMBODIMENTS

The present invention generates electrical power utilizing vertical up and down movement of a mass. The mass can be floating on a liquid such as water, can be immersed and movable in a column of liquid or can be dry and not in liquid. FIGS. 1-9C illustrate the mass in conjunction with a mechanism for directly generating power. FIGS. 10-18 illustrate the mass immersed in liquid and moving vertically within that liquid due to changes in the buoyancy of the mass.

In FIG. 1, there is shown a view of the electrical generation system 11 of the present invention, in accordance with a preferred embodiment. This system is similar to our earlier U.S. Pat. Nos. 7,075,190 and 7,199,483 in that linear-to-rotary converters are used to capture the up and down linear movement of a mass and convert that movement to rotary movement. However, this system uses the vertical movement of a mass 13 to directly rotate and operate a generator 15 to produce electrical power.

This application incorporates by reference the disclosures of U.S. Pat. Nos. 7,075,190; 7,199,483 and 7,432,612. The linear-to-rotary converters disclosed in these patents can be used on the embodiments shown in FIGS. 10-18.

Figure 6:
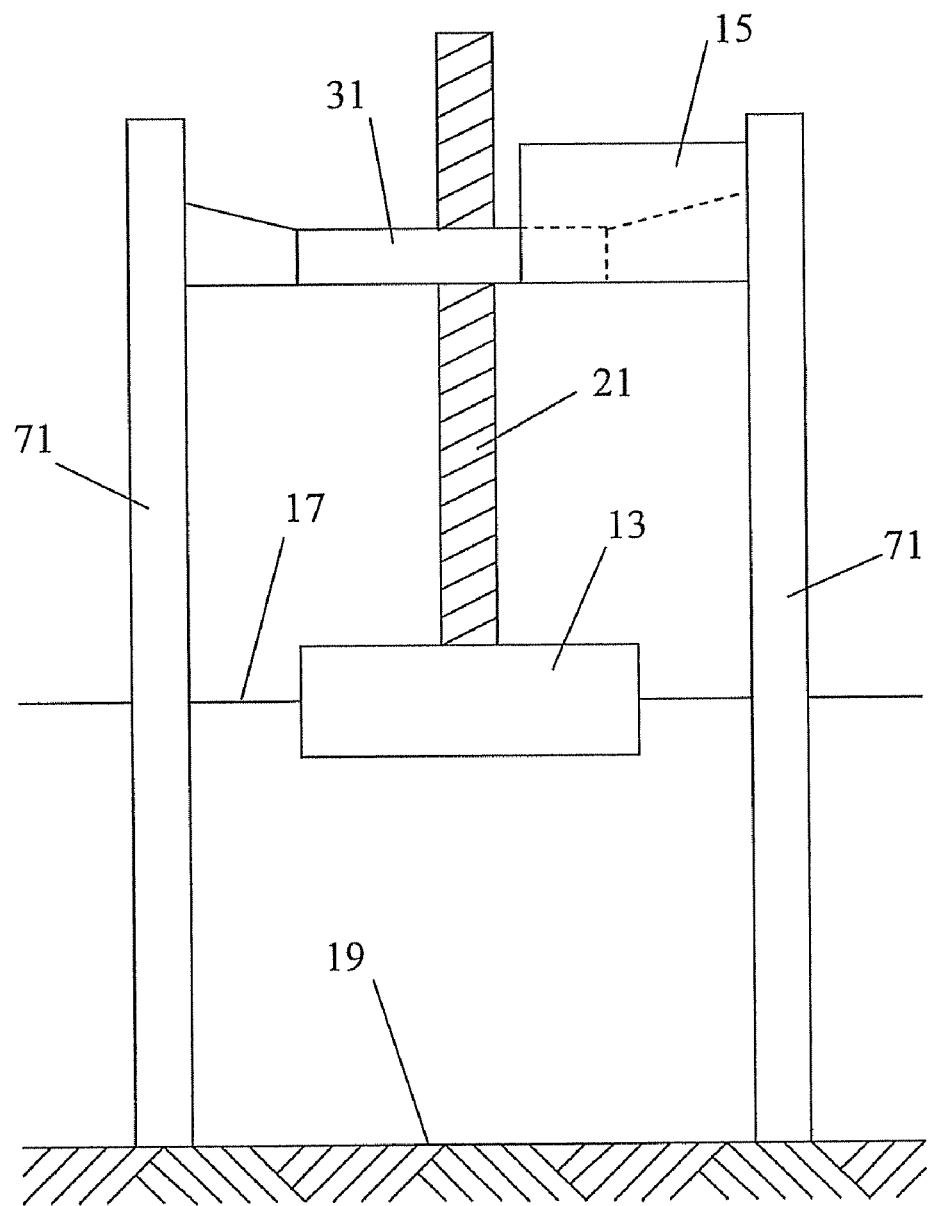
FIG. 6 is an elevational view of the system, in accordance with another embodiment.
Figure 7:
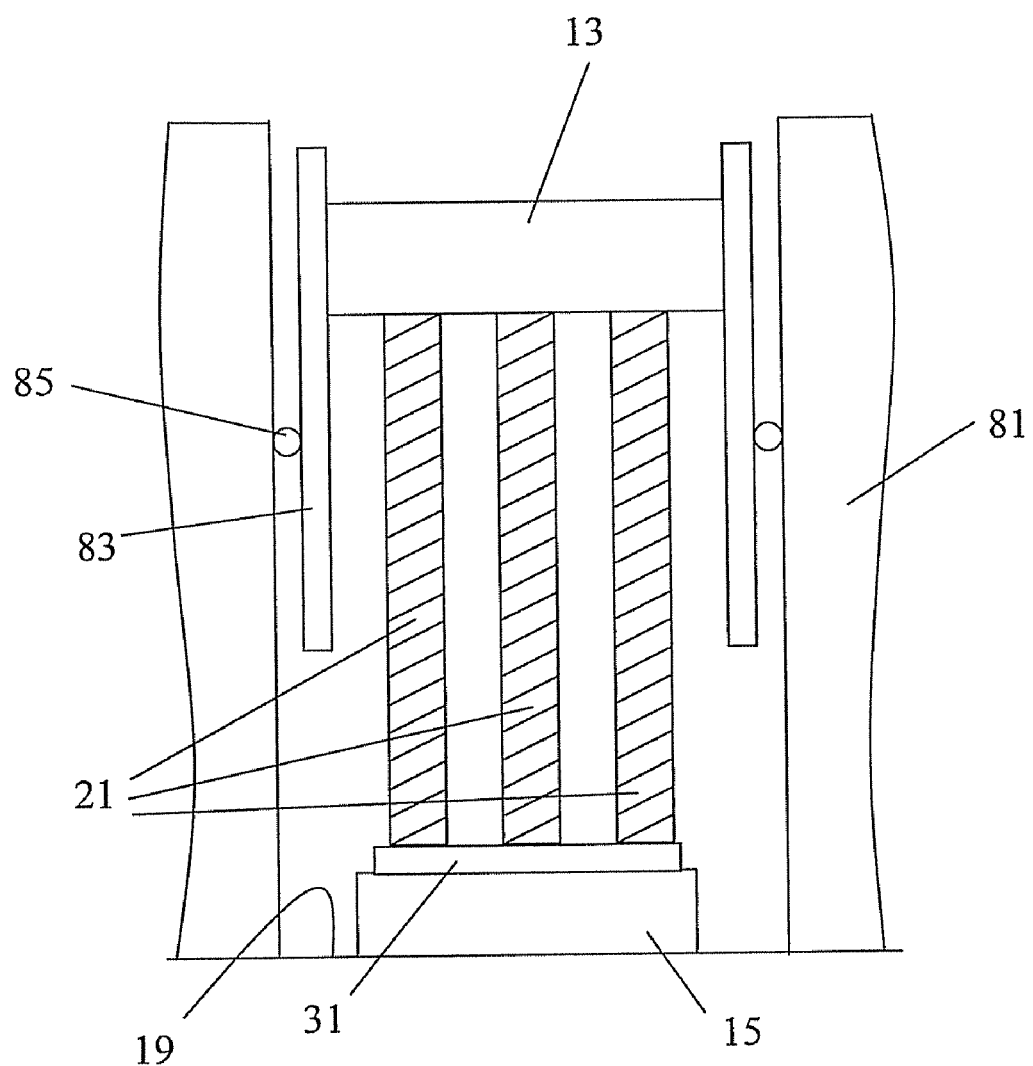
FIG. 7 is an elevational view of the system on land in an off-peak configuration, in accordance with another embodiment.
Figures 8, 9:
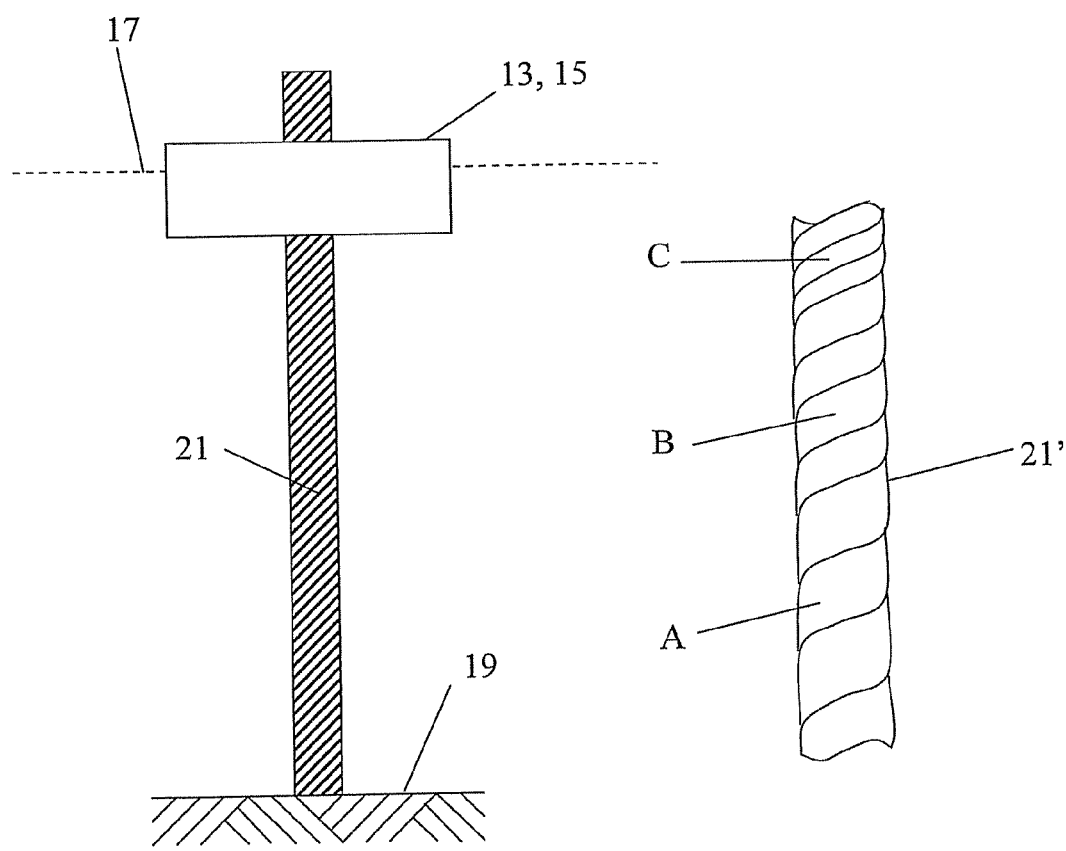
FIG. 8 is an elevational view of the system, in accordance with another embodiment.
FIG. 9 shows the spiral shaft in accordance with another embodiment.

The mass 13 can be buoyant and allowed to rise and fall on a body of water 17. This is shown in FIGS. 1, 4, 5 and 6. Electrical power can be produced as the mass rises and falls. FIGS. 7 and 8 show a mass 13 that is on land 19 and the mass is dry. The mass need not float on liquid. The mass 13 is moved to an up position. As the mass 13 falls, electrical power is produced.

The embodiments will now be described in more detail. In the description herein, like reference numbers on drawings indicate like parts.

Referring to FIG. 1, the system 11 in its simplest form has a mass 13, an electrical generator 15 and a spiral post or shaft 21.

The mass 13 can be any shape and size. Because the mass in the embodiments of FIGS. 1 and 4-6 is used to float on water, the mass is buoyant. The mass 13 could be a vessel hull, such as an ocean going ship, an inland (fresh water) ship, a barge, etc. The vessel hull can be a ship hull. After a ship has served a useful life, whether commercially or militarily, it is mothballed or scrapped. Using a scrapped ship hull reduces costs and allows the serviceable life of the hull to be extended.

The hull is stripped of all non-essential equipment, such as engines. In addition, the hull is sealed and made water tight. For example, the propeller shaft can be removed and the shaft opening sealed. Components subject to bimetallic degradation are removed. The deck can also be sealed in order to minimize the amount of freeboard. Minimizing the amount of freeboard allows for increased hull displacement, which in turn allows for an increase in power generation.

The vessel hull need not be a used hull, but could be constructed for this particular purpose. For example, because the hull need only move up and down and does not need to move horizontally, the hull can be a large rectangular box without any drag minimizing shapes or configurations. Such a hull can be designed to maximize buoyancy. The hull can be made of metal, wood, composites (such as fiberglass) or other materials. A deck or top is provided on the hull in order to keep rain and water from entering the hull. The weight of the hull can be adjusted with ballast and equipment. The side walls of the hull can be strengthened if need be. To this end, steel plates can be welded onto the inside or the outside of the hull.

If the tides are to be used to raise and lower the mass, the mass should be large. A large sized mass has negligible vertical movement due to normal wave action (waves a few feet high). Such a large sized vessel has a displacement of at least several thousand tons, say for example 3000 tons, or greater. Alternatively, the mass can be small enough to be moved up and down by waves.

The mass 13 floats on a body 17 of water, such as a bay that is subject to tidal activity. The mass could also float on a water body such as a lock, or other water body which changes water levels. The water body 17 can be salt water or fresh water, natural or man made. In addition, other liquids besides water could be used. For example, in cold climates, an anti-freeze solution can be used. If something denser than water is desired then muds (such as drilling muds) or other liquids could be used.

The mass can have a fixed or constant displacement. Alternatively, the mass can have a variable displacement. Such a variable displacement arrangement is described in our U.S. Pat. No. 7,199,483.

The electrical generator 15 is conventional, having a rotor 16 and a stator 18 (the rotor 16 and the stator 18 are shown in dashed lines in FIG. 1). As the rotor rotates relative to the stator, electrical power is produced. Typically, the rotor is encircled by stator. However, the stator could be the central component with the moving rotor encircling the stator. Thus, "rotor" as used herein is the moving generator component. A transmission 31 may be used as a gear reducer. The spiral shaft 27 typically turns relatively slow, so the transmission provides increased revolutions per minute to the generator 15.

In some embodiments (FIGS. 1 and 4-5), the generator 15 is located below the mass 13. In another embodiment (FIG. 6) the generator is located above the mass 13. This embodiment will be described in more detail below. In those embodiments where the generator is below the mass, the generator is submerged. The generator 15 and transmission 31 can be located in watertight housings. Seals are provided between the shaft 21 and the transmission 31 interior components. Alternatively, individual generator components can be watertight. For example, the rotor windings and stator windings can be watertight, as well as any control electronics.

The rotor of the generator 15 is rotated by the spiral post or shaft 21. The spiral shaft, which is shown in FIGS. 2 and 3, is a rod, post or shaft, with sides 23. The shaft is twisted, or otherwise formed, so that the sides 23 form spirals along the longitudinal axis of the shaft (the spirals are shown schematically in FIGS. 1, 4-8, etc.). The shaft 21 interacts with a plate 25. As shown in FIG. 3, the plate 25 has an opening 27 therethrough for receiving the shaft 21. The opening 27 in the plate 25 is shaped like the transverse cross-section of the shaft 21. The sides 23 of the shaft interact with the sides of the plate opening 27. The shaft 21 is able to move through the opening 27 in the direction of the shaft longitudinal axis. As the shaft so moves, the spiral sides 23 of the shaft force the plate 25 to rotate. The shaft 21 can be rectangular or square in transverse cross-section (see FIG. 3). Alternatively, the shaft cross-section can be other shapes, such as hexagonal or such as a round threaded screw (see FIG. 3A). If the shaft is a round threaded screw, the plate opening 27 is likewise round and threaded. As an alternative, the shaft can have spiral grooves formed therein, with the plate 25 having bosses that are received by the grooves. Thus, as the shaft moves vertically through the plate, the bosses track in the grooves.

The plate 25 is coupled to the generator 15 rotor 16, typically by way of a transmission 31. The plate 25 can be a gear. (In FIGS. 3A and 3B, the plate 25 is shown surrounded by a housing 26.) The transmission 31 takes the relatively slow rpms (revolutions per minute) of the shaft 21 and produces a higher rpm output suitable for the generator 15.

Although the shaft 21 moves through the plate, it is fixed to the mass 13. Thus, as the mass 13 moves up and down, the post 21 likewise moves up and down. In addition the post is non-rotating with respect to the mass. The mass 13 is secured from rotating in the water. For example, the mass can be tethered to the bottom by anchor lines 35 (FIG. 1). The anchor lines are arranged so as to minimize rotation. Alternatively, structure in the form of piers can be located along the sides of the mass 13, which piers serve as barriers to prevent rotation. As still another alternative, plural shafts 21 can be provided as shown in FIG. 7. In this configuration, each post 21 has a plate 25 that rotates. The plates 25 are tied together by gearing, such as in the transmission 31.

As the shaft 21 moves through the transmission 31 and the generator 15, the shaft may move below the generator (see FIG. 1). If the generator is on the bottom, then a cavity 41 or borehole in the bottom is located below the generator to receive the shaft. In deeper water, the generator may be off of the bottom a sufficient distance such that a cavity in the ground is not needed. In such an arrangement, the generator is supported off of the bottom by piers or other suitable support structure.

In operation, as the water body 17 changes levels, the mass 13, which floats, moves vertically up and down. The mass 13 moves the shaft 21 in an up and down arrangement. However, the shaft 21 does not rotate. The up and down movement of the mass causes the shaft to move through the plate 25 and the transmission 31 and rotate the plate 25. The rotating plate 25 in turn spins the other components of the transmission 31 which in turn spin the generator 15 rotor.

As the water level falls, the mass 13 falls and moves the shaft 21 down through the plate 25. The plate 25 rotates in a first direction. As the water level rises, the mass 13 which is buoyant, rises and moves the shaft 21 up through the plate 25. The plate 25 rotates in a second direction that is opposite to the first direction. When the plate rotates, if the transmission 31 is engaged, then the generator rotor 16 rotates to produce electrical power. The transmission 31 may be disengaged so that the generator does not rotate; such as for maintenance, etc.

Thus, the vertical movement of the mass is directly translated into electrical power. There is no need for intermediate systems, such as hydraulic systems, to convert the linear motion of the mass into rotary motion used by the generator 15. The system is low on cost, particularly if used ship hulls are used as the mass 13. The system is also low in maintenance requirements as it has few moving parts.

The spiral shaft 21 can be coated in a low-friction material such as polytetrafluoroethylene (PTFE) or a ceramic alloy of boron, aluminum, magnesium and titanium boride (BAM). These coatings can be used on other components as well to reduce friction.

Figures 4, 5:
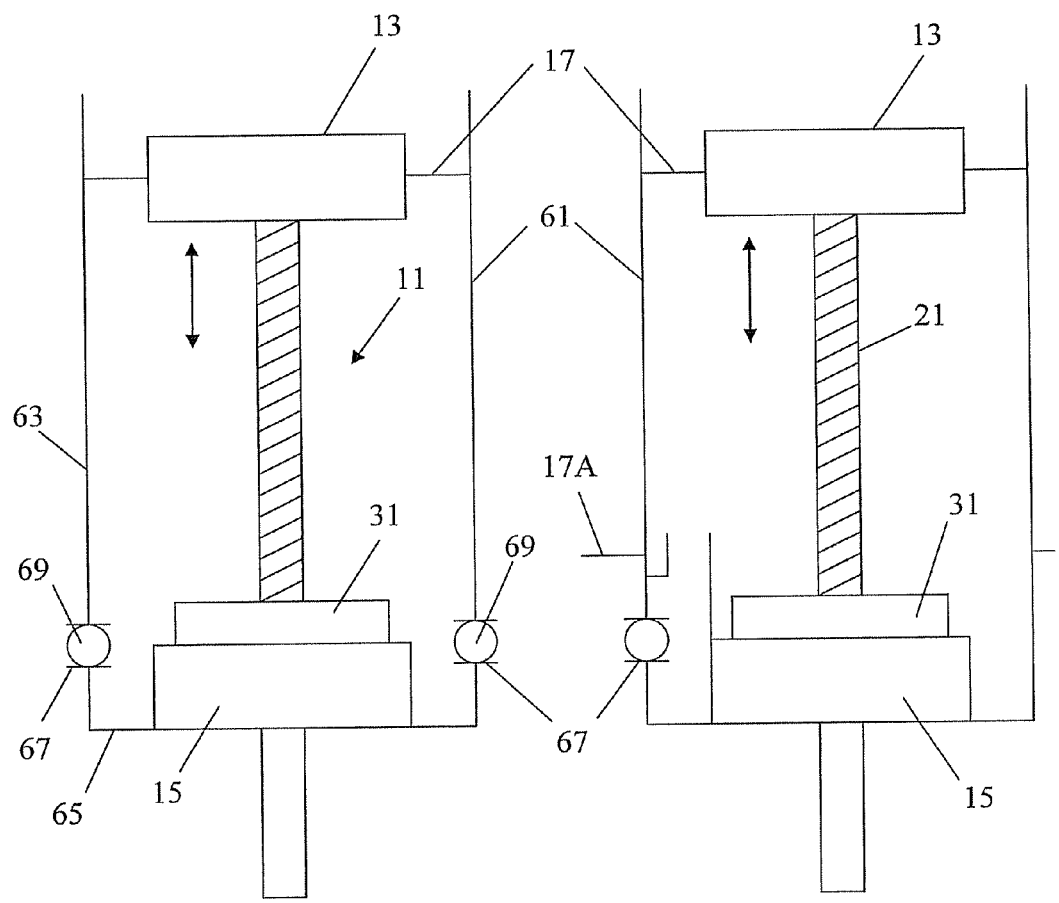
FIG. 4 is an elevational view of the system with a harborage, in accordance with another embodiment.
FIG. 5 is an elevational view of the system with the harborage and used for off-peak energy storage, in accordance with another embodiment.

The system 11 can be used in a harborage 61 or lock, as shown in FIG. 4. The harborage protects the mass 13 from wind and waves, particularly if the mass is located in open, unprotected water, such as a bay. In addition, the harborage 61 can be used to regulate the water level independently of the surrounding water. In most locations, the harborage 61 completely surrounds the mass 13. However, in some locations, the harborage need not surround the mass, but only need be between the rough water and the mass, much like a breakwater.

For an enclosed harborage, the harborage 61 has side walls 63. The side walls can be set into the bottom of a body of water, such as a bay or channel, or it can be attached to a bottom wall 65 which bears on the bottom of a water body. Beneath the bottom wall 65 is foundational structure. A roof or top wall can optionally be provided so as to fully enclose the mass and allow the interior to be sheltered from the weather.

The harborage 61 can be made of metal or concrete or even of earth walls. For example, the harborage could be a dry dock that is to be mothballed or a caisson that is floated to the desired location and then sunk. The harborage could also be of coffer dam type which has vertical steel panels inserted into the bottom of the water body.

The harborage 61 has one or more ports 67, or openings, in one or more of the side walls 63. The ports 67 are located below the lowest level of water outside of the harborage, such as below the lowest tide. In the preferred embodiment, the ports 67 are equipped with valves 69. When the water level inside the harborage is lowered and the valves 69 are closed, the harborage can be used to maintain or repair the mass 13, much like a dry dock.

The harborage 61 is deep enough and large enough so that the mass 13 is always floating, even with low tide or low water levels. If the harborage is not deep enough, and there is no bottom wall, the bottom can be dredged out or excavated to increase the depth beneath the mass 13. The side walls 63 of the harborage 61 are high enough to offer protection from wind and waves, particularly in stronger weather. To minimize damage, the mass should be shielded from exposure to high wind and waves.

As the tides change, water moves in and out of the harborage. In the preferred embodiment, the water ingresses and egresses the harborage through the ports 67. When the tide is coming in, water enters the harborage through the ports 67 and lifts the mass 13. When the tide is leaving, the water exits the harborage through the ports 67, allowing the mass 13 to lower. Thus, the mass 13 moves vertically up and down inside of the harborage 61.

The harborage 61 can be used to allow the mass 13 to rise and fall independently of the timing of the tides. As shown in FIG. 5, the water level 17 in the harborage is high; the harborage was flooded when the water outside of the harborage 61 was at high tide level. The water level 17A outside of the harborage 61 has fallen as shown in FIG. 5, such as might be found at low tide. Thus, as head exists between the two water levels 17, 17A, inside and outside of the harborage. The valves 69 in the ports 67 in the harborage are closed. To generate electrical power, the valves 69 are opened and water is allowed to drain out of the harborage, and the mass 13 to fall, thereby moving the spiral shaft 21 and rotating the generator. With the harborage 61 having a low water level, the valves 69 are closed and the water outside of the harborage rises to high tide. The ports are then opened to allow the mass to rise.

The harborage thus allows electrical power to be generated at times when the water level outside of the harborage is not changing, or is changing slowly. In addition, the harborage speeds the rise and fall of the mass. For example, if the time between high and low tides is six hours, then using the harborage with valved ports 67 could shorten the time the mass moves between high and low positions to something less than six hours, say for example one hour. Plural harborages can be used, with each harborage having one or more masses. The valved ports on each harborage can be operated independently of the other harborage so that the mass or masses in a first harborage can move independently of the mass or masses in a second harborage, and so on with other harborages.

The system can be used in a lock, such as in association with a dam.

The generator 15 can be located below the mass as previously discussed. Alternatively, the generator 15 can be located above the mass 13. As shown in FIG. 6, the generator 15 is supported above the water body 17 by support structures 71, such as piers, which piers bear on the bottom 19. As the level 17 of the water body rises and falls, the mass 13 also rises and falls, pushing and pulling the spiral shaft 21 through the transmission 31. FIG. 6 also illustrates an embodiment where the generator 15 is offset laterally from the transmission 31 so that the shaft 21 passes through the transmission but not through the generator. This offset generator arrangement can be used when the generator is submerged, as shown in FIGS. 1, 4 and 5 and also in the arrangement of FIGS. 7 and 8.

FIG. 7 shows the use of the system outside of water, such as on land 19 or above the surface of water. The mass 13 can move vertically up and down with plural spiral shafts 21. Each shaft 21 is received by a plate in the transmission 31. The plates are rotatably coupled together. The use of plural shafts 21 provides lateral stability to the mass. To provide even more stability to the mass, or in lieu of plural shafts 21, side structure 81 can be used. If the mass starts to move sideways, such as if by wind, then it will contact the side structure 81. The side structure 81 need not contain a column of water. In such an embodiment, the mass 13 need not be buoyant.

The arrangement of FIG. 7 can be used for off-peak storage. For example, with regard to wind generated electrical power, in many locations, wind is intermittent and tends not to blow during times of peak energy need. Wind generators can be used to raise the mass 13. When the wind no longer blows sufficiently to produce power, the peaking units of FIG. 7 can be used. The electrical energy produced by the wind generators raises the mass 13. This can be accomplished, for example, by using racks 83 and pinions 85. The racks 83 are coupled to the mass, while the pinions 85 and their associated electric motors (not shown), are mounted to the support piers or side structure 81. The off-peak energy operates the motors, which rotate the pinions 85 and raise the racks 83 and the mass 13 to an elevated position. Alternatively, the racks 83 can be coupled to the support structure 81 while the pinions 85 and their motors are coupled to the mass. The transmission 31 can be decoupled from the shafts 21 as the mass 13 is raised in order to reduce the power required to raise the mass. Once the mass 13 is raised, the transmission 31 is reengaged. Alternatively, electric motors can be used to rotate the plates 25, which in turn raise the shafts 21 and the mass 13.

The mass 13 is held in the raised position by the electric motors, which act as brakes. Other devices can be used to hold the mass in the raised position.

When electrical power is needed, such as during peak demand, or the wind is not generating sufficient power, the mass 13 is released and allowed to fall. The shafts 21 pass through the plates, causing the plates to rotate, and the generator rotor to rotate, wherein power is produced. Not all of the off-peak power used to raise the mass can be recaptured due to friction, etc. But, power can be generated during times of need, such as peak times.

FIG. 8 shows the system in accordance with another embodiment. This system can be used either on dry land or in water. The shaft 21 extends from the support bottom 19 in a vertical arrangement. The shaft does not rotate and is stationary. The mass moves up and down along the shaft 21. The generator 15 and mass 13 are combined into one unit; the generator 15 adds mass to the mass 13. As the generator 15 and mass 13 fall on the shaft 21, the generator rotor rotates. The mass 13 and generator 15 are stabilized against rotation, so that only the rotor rotates. A transmission may be used as well. This arrangement can be used in water 17 (the top level of which is shown by dashed lines) or outside of water.

Figure 8A:
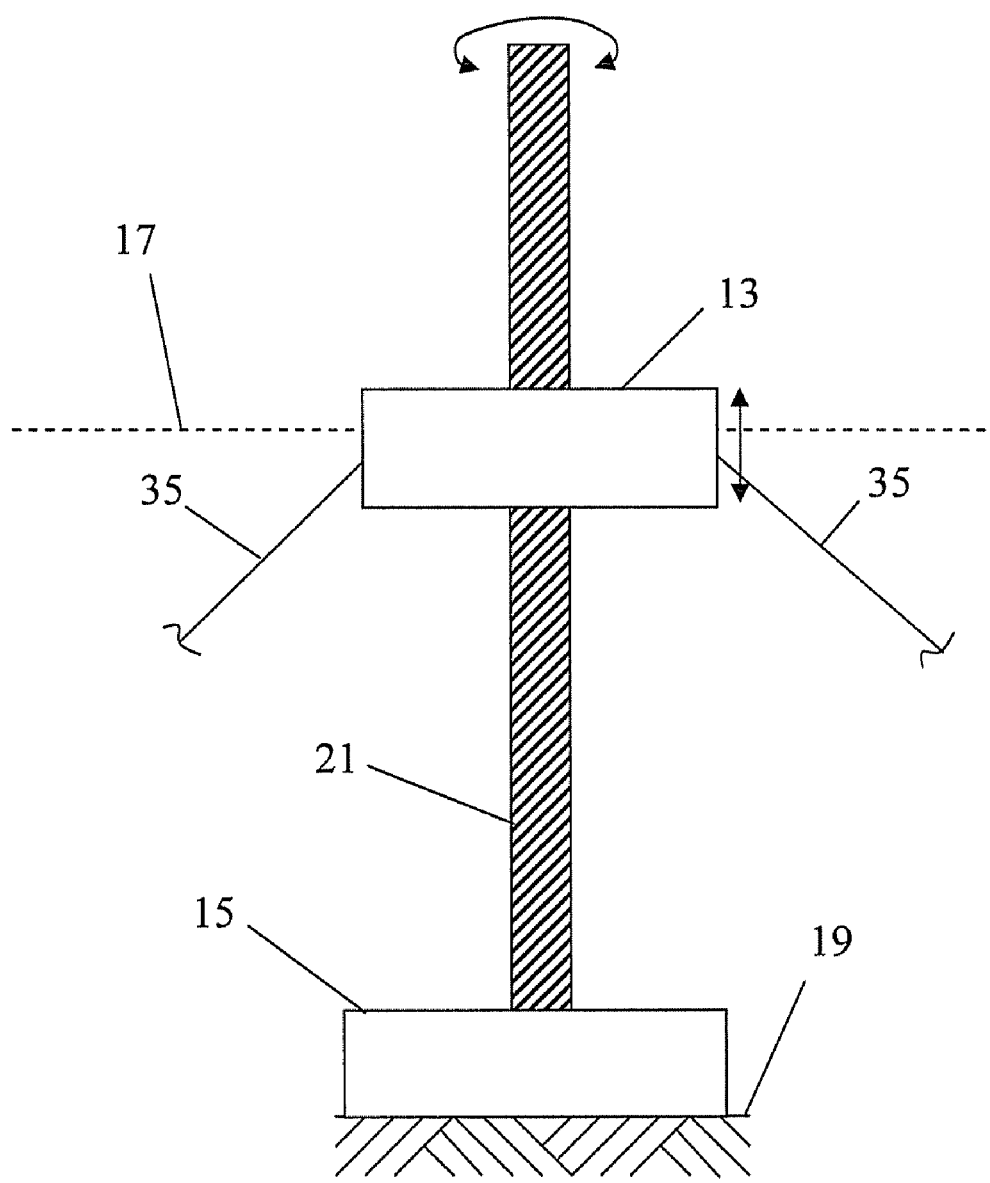
FIG. 8A is an elevational view of the system, in accordance with another embodiment.

FIG. 8A shows the system in accordance with another embodiment. Unlike FIGS. 1, 4-7 wherein the shaft 21 moves longitudinally, the shaft 21 in FIG. 8A does not move longitudinally. However, the shaft rotates as the mass 13 moves up and down along the shaft. The mass is prevented from rotating by the anchor lines 35 or by guides 81 (see FIG. 7). The mass has a plate similar to the plate 25 of the generator shown in FIGS. 3 and 3A. The plate for the mass is fixed and secured to the mass. As the mass moves along the shaft longitudinally, the plate follows the spirals of the shaft and forces the shaft to rotate. As the mass moves up, the shaft rotates in one direction. As the mass moves down, the shaft rotates in the opposite direction. Because the shaft and generator do not move longitudinally with respect to each other, the shaft is coupled to the generator plate so that the generator plate rotates in unison with the shaft. Thus, as the mass moves along the shaft, the shaft rotates which in turn rotates the generator plate to produce electrical power.

Thus, there are several different ways to utilize the vertical movement of the mass to impart rotation to the generator rotor by the shaft 21. One way is shown in FIGS. 1, 4-7 where the mass moves the shaft longitudinally relative to the generator. Another way is shown in FIG. 8, where the mass and generator move longitudinally along the shaft. Still another way is shown by FIG. 8A where the mass moves relative to the shaft and the generator.

FIG. 9 illustrates a spiral shaft 21' in accordance with another embodiment. The shaft 21' has variable thread pitch in order to assist in overcoming the inertia of changing direction. As the mass 13 falls and then rises, it undergoes a change in direction. This causes the mass to come to a complete stop. Likewise, the plate and some or all of the transmission moving components undergo a change in direction. Ideally, the mass falls to the bottommost position and remains stationary until all the rotating components in the transmission stop moving. Once the rotating components are stationary, the mass can move upward. To assist the mass in beginning to move, the thread pitch on the shaft is wide A, so that the load on the shaft is less. This wide pitch A engages the plate 25 first. As the mass begins to move and the rotating components in the transmission and generator begin to move again, the thread pitch can tighten B, effectively increasing the load. This tighter pitch B engages the plate 25 next. The pitch can continue to tighten until a minimal operating pitch C is reached, which pitch engages the plate 25. The wide pitches A are located at the ends of the shaft, with the narrow pitch C located in the middle of the shaft. Thus, a shaft with variable pitch may be, from end to end, A-B-C-B-A. The shaft pitch decreases as the mass changes direction, as the ends with pitch A will engage the transmission or generator.

Even though the mass 13 and the shaft 21 change direction, the generator 15 preferably does not. A switching gear can be provided between the transmission and generator, which gear rotates the transmission rotor in the same direction regardless of the direction of shaft and mass movement.

As an alternative, the transmission can engage the generator in one directional movement of mass and then disengage the generator in the opposite directional movement of the mass. This arrangement only produces power with the mass moving in one direction, such as is found in the peaking unit of FIGS. 7 and 8.

In order to gain efficiency from the system, a flywheel can be used. The flywheel continues to rotate and preserve momentum, even as the mass changes direction. As the mass changes direction, between up and down transversals, the flywheel rotates in the same direction. Because a flywheel is used, the shaft or post of FIG. 9 is not used, in order to have the flywheel rotate at a more or less constant speed.

Figure 9A:
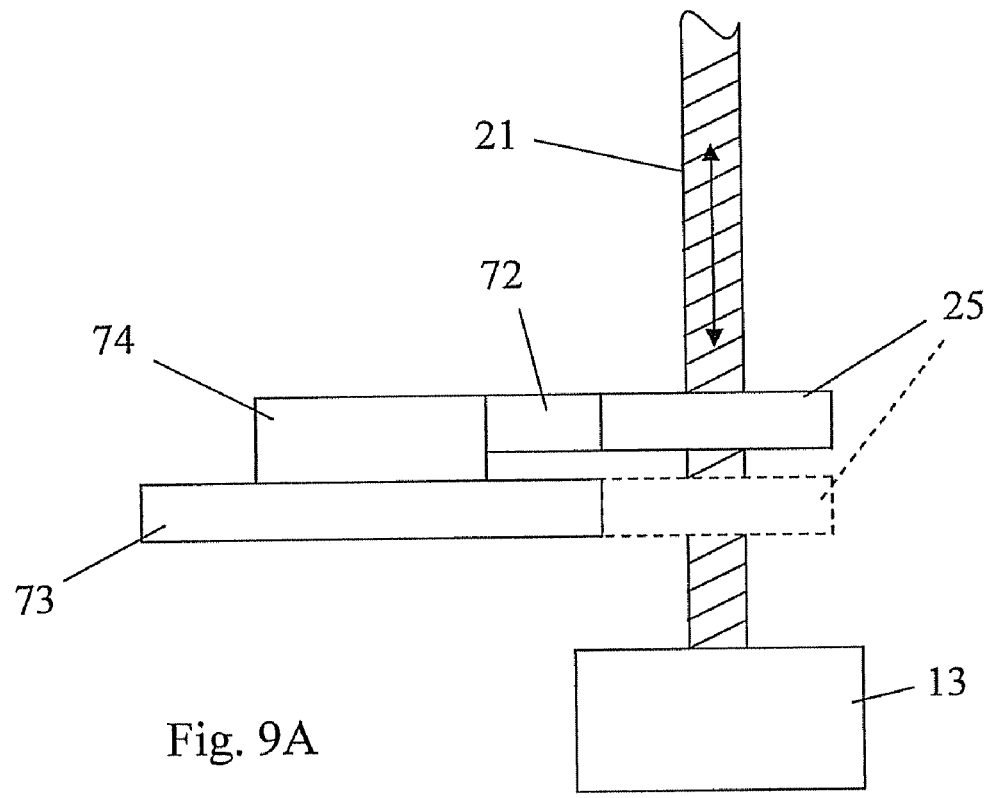
FIGS. 9A and 9B show the mass and spiral shaft with a flywheel.
Figure 9B:
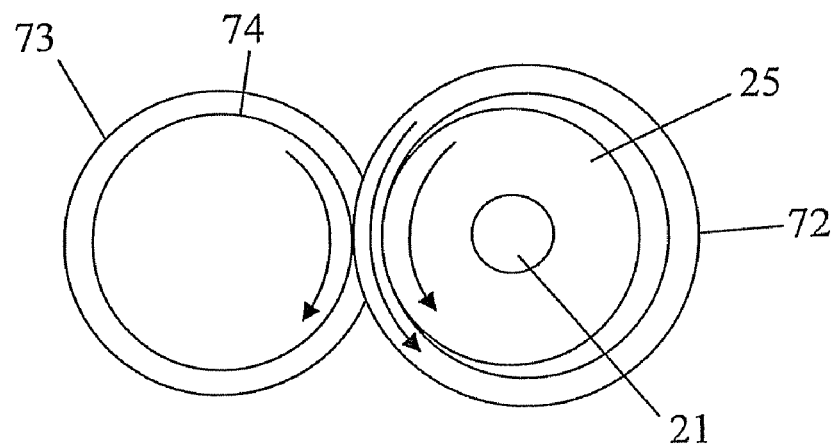

Referring to FIGS. 9A and 9B, the mass 13 and spiral shaft 21 move up and down as previously described. The plate 25, which engages and is rotated by the spiral shaft 21, engages and rotates the flywheel 72. The plate 25 can either directly engage the flywheel as shown by solid lines in FIG. 9A, or indirectly engage the flywheel, as shown by dashed lines in FIG. 9A, by way of one or more reversing gears 73. For example, with reference to FIGS. 9A and 9B, as the mass rises, the spiral shaft 21 moves up and rotates the plate 25 in a first direction. The plate 25 (shown by solid lines) directly engages the flywheel and rotates the flywheel in the first direction (counterclockwise as shown in FIG. 9B). As the mass changes direction from moving up to moving down, the plate 25 disengages from the flywheel and moves down to engage the reversing gear 73 (the plate 25 is shown by dashed lines). The reversing gear 73 extends underneath (or above) the flywheel and has a reversing flywheel gear 74 that engages the flywheel so as to continue to rotate the flywheel in the same direction (counterclockwise as shown in FIG. 9B). The reversing flywheel gear 74 rotates in unison with the reversing gear 73.

In the preferred embodiment, the flywheel 72 is a ring, with one of either the plate gear 25 or the reversing flywheel gear 74 engaging the inside diameter of the flywheel ring and the other of the plate gear or the reversing gear engaging the outside diameter of the flywheel. The plate and reversing flywheel gear can contact the flywheel directly or through intermediate engaging gears. The engaging gears allow the plate, for example, to engage and disengage the flywheel during a change of direction. The reversing gear and the plate need not contact the flywheel on opposite diameters. For example, the plate and reversing gear can contact the flywheel both on the inside diameter. In such a setup, the reversing gear contacts the flywheel through an intermediate gear which does not rotate in unison with the reversing gear; this allows the flywheel to continue rotating in the same direction.

With the flywheel 72, momentum can be stored and carried over while the mass 13 changes direction. The flywheel drives the generator rotor. Thus, power is generated while the mass changes direction.

FIGS. 9A and 9B illustrate a flywheel with one plate 25. A flywheel can have one or more plates 25. For example, as shown in FIG. 9C, plural spiral shafts 21 can be provided, each of which engages a plate 25. The spiral shafts 21 can be driven by a single mass, or by plural masses, with each mass driving one or more spiral shafts.

FIGS. 9D and 9E show the spiral shaft in accordance with other embodiments, which can be used with a flywheel 72 and which allows both directions of rotation to be utilized. In FIG. 9D, as the spiral shaft 21 rotates in one direction, plate 25 engages the flywheel 72. As the spiral shaft rotates in the opposite direction, plate 25 is disengaged from the flywheel, while engaging and rotating reversing gear 73 via a secondary gear 76. Reversing gear 73 rotates the flywheel 72. The plate 25 rotates the secondary gear 76 by smaller gears 78. The axes of rotation of the gears 78 are perpendicular to and offset from the axes of rotation of the plate 25 and the gear 76. The gear 76 is axially spaced from the plate 25. A similar arrangement is shown in FIG. 9E, except that the gear 76 is spread radially from the plate. The gears 78 rotate about axes that are parallel to the axes of rotation of the plate 25 and the gear 76.

Figures 10, 11:
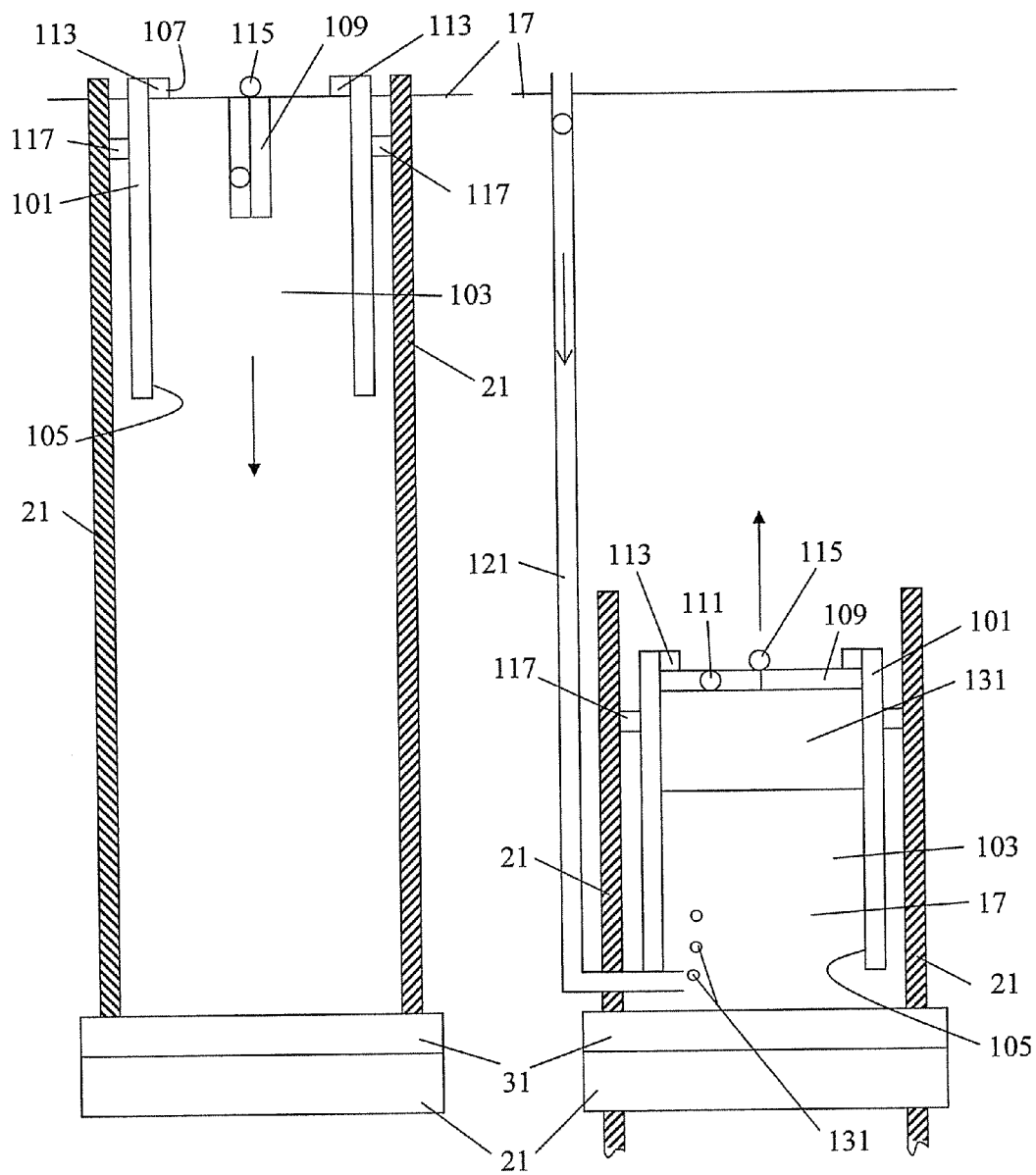
FIGS. 10 and 11 are elevational views of a power generating system, in accordance with another embodiment, showing the use of a mass (shown in cross-section) that falls (FIG. 10) and rises (FIG. 11) in water, using gravity and buoyancy respectively.

The mass can have a variable displacement. FIGS. 10 and 11 show such a mass 101 that moves vertically in a column of liquid 17. The mass 101 changes between configurations. In one such configuration, a sinking configuration, the mass 101 sinks to the bottom (FIG. 10). In another configuration, a rising configuration, the same mass 101 rises (FIG. 11). When the mass 101 sinks, it utilizes gravity and has a negative buoyancy relative to the liquid 17. When the mass 101 rises, it utilizes positive buoyancy relative to the liquid 17. As the mass 101 rises and falls, it produces power by using the spiral shafts 21, a piston-cylinder arrangement, or some other arrangement. (In FIGS. 10-15 and 18, the cross-sectioning of the mass and other components is not to be confused with the spirals shown on the shafts 21.)

The mass 101 is generally tubular when in the sinking configuration, having an interior cavity 103 therein. The mass 101 has an open bottom 105 and a top 107 that can be opened or closed. A cap 109 is provided to close the top 107. The cap 109 can move between open and closed positions. As the mass is configured for sinking, the cap 109 is in the open position (see FIG. 10). This allows the mass to sink faster, as the cap 109 does not create drag. The cap 109 could be closed when the mass is in the sinking configuration, wherein the mass would sink, although at a slower speed. In some configurations, such as using the spiral shaft 21 with small, close pitches, the effective drag on the speed of sinking of the mass may be irrelevant. If the mass falls or sinks slowly due to a slow traverse of the spiral shaft through the transmission plate or generator, then drag may not be a factor. In such a case, the cap may be closed in both the sinking and rising configurations. In such a case, the cap can be permanently closed, with a high spot so the gas will be collected and vent through a valve 111 located on the cap.

With a cap 109 that is capable of opening and closing, when the cap is closed, it forms a seal at the top of the cavity 103. A lip 113 can be provided at the top end of the mass to assist the cap in making a seal; the cap is beneath the lip. The cap 109 is closed when the mass is in the rising configuration. If the mass is a cylindrical sleeve, then the cap forms two semi-circular shapes or leaves. The leaves depend down as shown in FIG. 10. A support shaft 115 is used for the leaves, which shaft spans the inside diameter of the mass at or near the lip 113. When the cap 109 is closed, the leaves swing up. Moving the cap 109 leaves can be accomplished by gears on the support shaft, by lines that pull the leaves into position, etc.

The mass is coupled to one or more spiral shafts 21 by supports 117 (such as collars around the shafts). The shafts 21 are rotatably coupled to a transmission 31 and a generator 15. The system is located in a water body 17. The level of the water can change or it can be constant. The deeper the water, the longer the column of water that can be traversed by the mass 101 and the more power that can be produced.

In operation, the mass 101 is at a top position and is configured for the sinking configuration (see FIG. 10). The cap 109 is opened, and water enters the mass cavity 103, wherein the buoyancy of the mass 101 is made negative. Water fills the mass cavity 103. Now negatively buoyant, the mass 101 falls, driving the spiral shafts 21 through the transmission 31 and generating electrical power through the generator. Although the generator 15 and transmission 31 are shown on the bottom, the generator and transmission could be on top of the mass or combined with the mass with the shafts fixed, as previously discussed.

When the mass 101 reaches bottom, it is configured for rising. The cap 109 closes the top 107 of the cavity 103. The cavity is still filled with water at this time. In order to change the buoyancy in the mass 101, gas is provided to the cavity via a gas source. One such gas source is shown in FIG. 11 as a pipe 121 that extends from the surface down to beneath the mass bottom end 105. The pipe 121 provides gas 131 to the interior cavity 103 of the mass. The gas is pressurized to at least the pressure of the water inside of the mass at the bottom position. The gas enters the mass through the open bottom end 105. As the gas enters the cavity 103, it displaces water from the cavity. The displaced water exits the cavity from the bottom end 105. A sufficient amount of gas is provided to the cavity to provide positive buoyancy to the mass 101, wherein the mass begins to rise. Typically, the entire cavity need not be evacuated of water. As the mass rises, it moves the spiral shaft 21 through the transmission 31 and produces electrical power by the generator 15.

When the mass 101 reaches the top position, a vent 111 in the cap can be used to vent the gas from the cavity to the exterior and change the buoyancy from positive to negative. Once the cavity is filled with water, the cap 109 can be moved to the open position as shown in FIG. 10. Alternatively, a vent 111 need not be provided, with the cap 109 moving to the open position to vent the gas out of the mass cavity.

The gas used to displace the water in the cavity and create positive buoyancy from the mass can be provided from a number of sources. The gas 131 can be compressed at the surface and piped down through the pipe 121. Other sources of gas could be used. For example, the gas from a gas well can be used (see for example 231 in FIG. 17). A gas well produces natural gas and other gasses. The natural gas can be dried and piped directly into the cavity. Such natural gas is typically under natural pressure and need not be repressurized. In some situations, a pipeline 122 of pressurized natural gas (see FIG. 11) may be relatively near to the system. Gas can be provided by the pipeline 122 to the interior of the mass when the mass is at the bottom position. Alternatively, a compressor 124 can be used to pressure the gas, which gas can be air. As still another alternative, recapturing units can be located so as to recapture the gas when it is vented from the mass. Such a recapturing unit is discussed below with respect to FIG. 16.

Variations of the system are discussed below. Although in some of the Figures (FIGS. 12, 13A, 13B, 16 and 17) only the mass is shown, it is understood that various mechanisms can be used to capture the energy of descent and/or ascent of the mass to produce electrical power. For example, the spiral shafts 21 can be used, as can the piston-cylinder arrangement.

Figure 12:
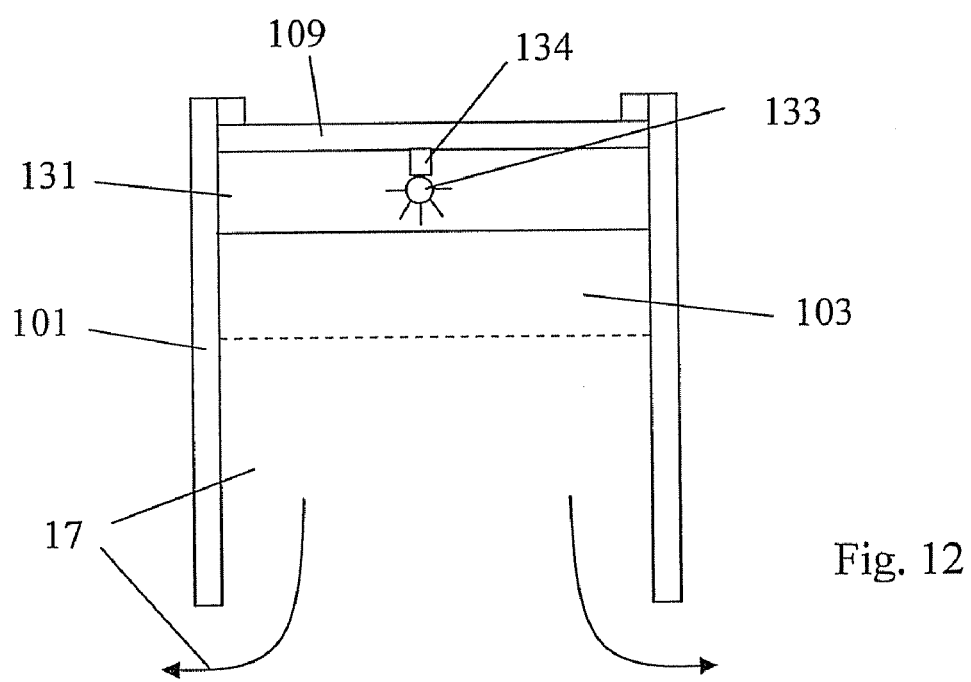
FIG. 12 shows a cross-sectional view of the mass with a gas generating agent.
Figure 13:
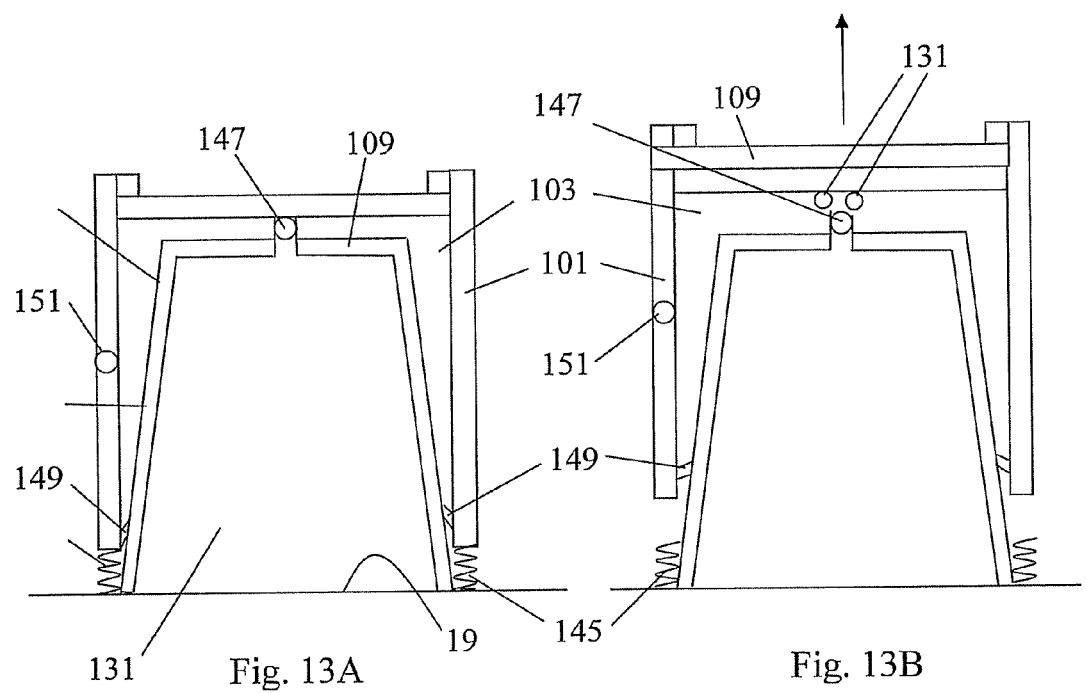
FIGS. 13A and 13B show cross-sectional views of the mass used with an inflation station.

FIG. 12 shows another gas source. A gas generating agent 133 is provided inside the cavity. The gas generating agent can be a solid that is ignited to produce the gas. The gas produced displaces water in the cavity. For example, the gas generator can be the same material used to inflate vehicle airbags. U.S. Pat. No. 7,404,574 discusses a gas generating agent made of guanidine nitrate and copper nitrate or of nitro guanidine and strontium nitrate. Such of an oxidizer may be required to establish combustion; such an oxidizer can be provided in solid form.

Another gas generating agent contains an acid and a base that reacts in water to produce gas. For example, the base may be sodium bicarbonate and the acid can be citric acid. When the two react together, $CO_2$ gas is produced. As another example, hydrochloric acid limestone can be contacted together to produce $CO_2$.

The gas generating agent 133 can be located in the mass cavity 103 in several ways. One way is to insert the gas generating agent 133 into the mass cavity when the mass is at its topmost position. When the cap 109 is open, the gas generating agent can be provided in a receptacle inside of the cavity. Alternatively, the gas generating agent can be provided when the mass is at its bottom position, such as via piping and in a powdered or pelletized form.

Ignition of the gas generating agent 133 occurs when the mass 101 is at its bottommost position and the cap 109 is closed. Ignition involves using an igniter 134 that provides sufficient heat to initiate combustion of the gas generating agent 133. Ignition can occur manually or automatically. If the ignition is manual, typically some indication is provided that the mass is at the bottommost position and the cap is closed, wherein the mass is ready to accept gas. If ignition is automatic, this indication is instead used to trigger ignition.

The provision of gas 131 in the mass interior can be manual or automatic regardless of the method of providing gas. If a pipe 121 with compressed air is used, then a valve is provided to regulate the flow of air into the mass. Likewise, if a natural gas well 231 or pipeline is used, a valve is provided to regulate the flow of gas. The indication that the mass is ready to receive gas is provided to the operator of the valve. If valve operation is automatic, then the signal that is used to indicate the mass is ready is used to operate the valve.

FIGS. 13A and 13B show another embodiment of the bottommost position of the mass 101. An inflation station 141 is shown on the bottom 19. The inflation station has side walls 143 that are tapered from the bottom end to the top end; this allows the mass to fall down on top of the inflation station without becoming hung on the top of the inflation station. At the bottom end of the inflation station 141 are springs 145. A nipple valve 147 is provided on the inflation station, within the mass cavity 103. The mass cavity has seals 149 located near the bottom end of the mass. The interior of the inflation station 141 has compressed gas 131.

In operation, as the mass 101 descends, its side walls pass along the inflation station side walls 143. Water in the mass cavity 103 is displaced by the inflation station entering the mass cavity 103. The water exits the mass cavity through the open bottom end of the mass. As the mass gets near the bottommost position, the seals 149 engage the inflation station 141. One-way valves 151 are provided in the mass so that the water in the mass can continue to be expelled from the cavity due to displacement thereof by the inflation station. When the mass is at its bottommost position, the inflation station occupies a large amount of the volume of mass interior 103. Thus, a large quantity of water is displaced from the mass cavity by the inflation station. The valve 147 is opened on contact by the mass and remains open until a predetermined flow or volume of gas has been released into the cavity 103. The mass contacts the springs 145, which springs cause the mass to bounce or move back up. As the mass moves up, gas continues to be released into the interior. The mass achieves positive buoyancy and begins to move up on its own. The timing between the mass moving up due to the spring bounce and moving up to positive buoyancy should overlap, so that the mass achieves positive buoyancy as the mass is still moving up due to the spring bounce. This avoids the mass settling back down onto the inflation station.

Figure 14:
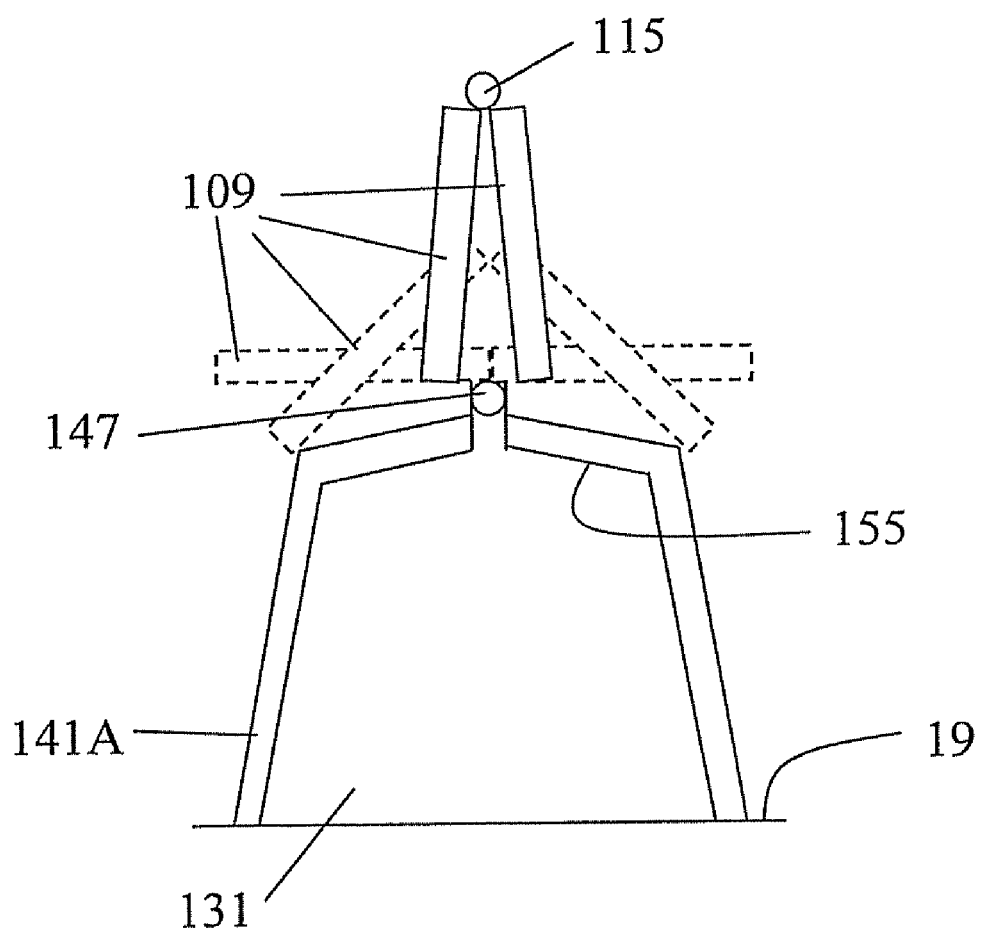
FIG. 14 shows elements of the mass descending onto the inflation station, in accordance with another embodiment.

FIG. 14 illustrates the inflation station 141A in accordance with another embodiment. The top wall 155 of the inflation station is peaked in the center and sloped down at the edges (where the top wall meets the side wall). The peak is a ridge that is aligned with the support shaft 115 of the cap 109. As the mass 101 moves down (in FIG. 14, only the cap 109 of the mass is shown for illustrative purposes), the cap 109 leaves engage the top wall 155 of the inflation station. As the mass continues to move down, the cap leaves track along the top wall and move to the closed position. These are shown by dashed lines in FIG. 14.

Figure 15:
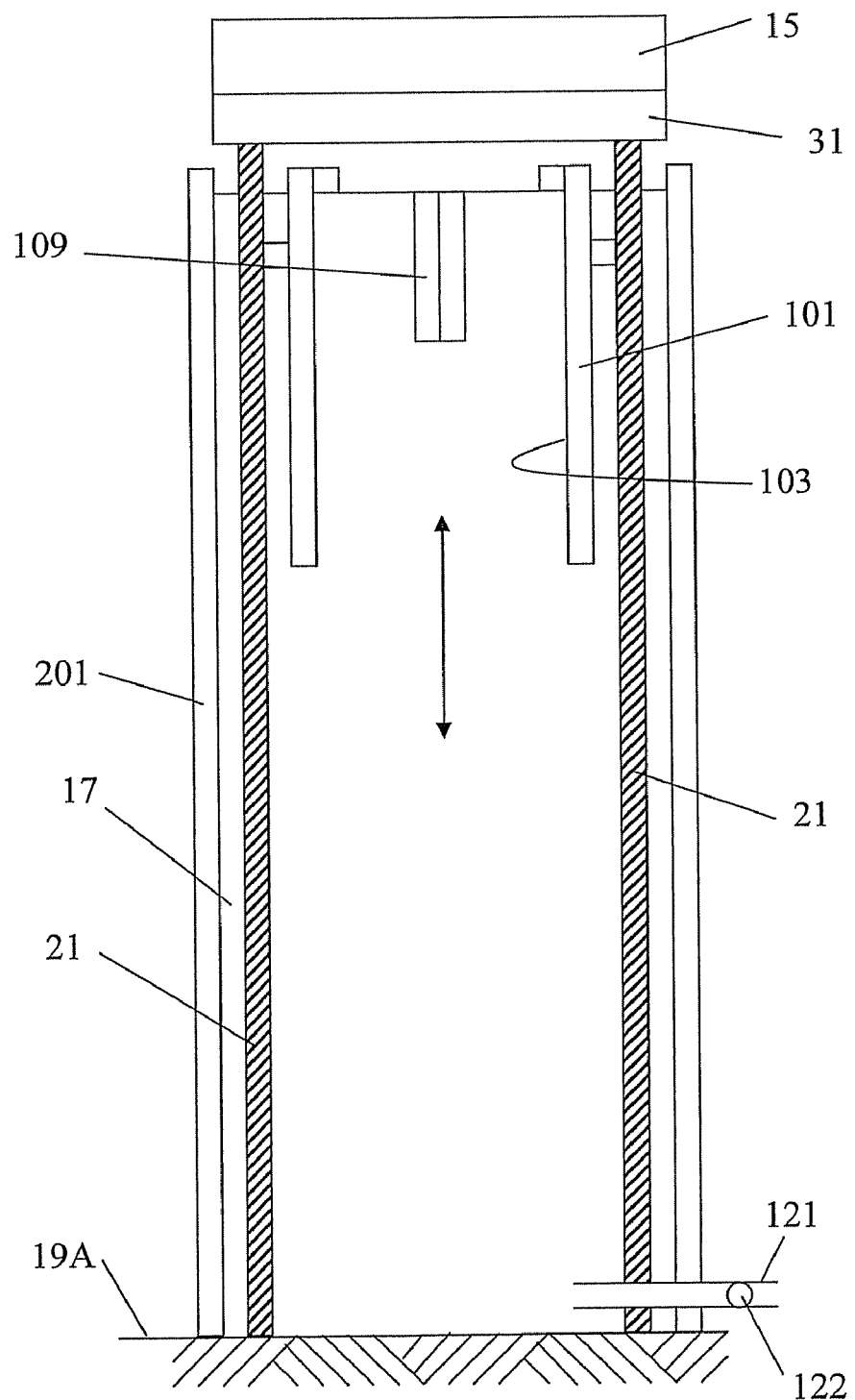
FIG. 15 shows a cross-sectional view of the mass in a tower.

FIG. 15 shows another embodiment of the system. The system is located on dry land 19 and outside of water. A tower 201 is provided, which tower contains a column of water 17. The tower has side walls and a bottom wall. The tower top may be open or closed. Thus, the water body 17 is a man-made water body, instead of a natural water body (such as a lake or bay). The mass 101 operates as discussed above, rising and falling in the water body 17. As an alternative to the tower 201, a pit can be dug underground. Both the pit and the tower provide a column of water 17, in which the mass 101 can traverse up and down. FIG. 15 also shows the generator 15 on top, instead of on the bottom. A pipe 121 provides gas to the interior of the mass 101 when the mass is at the bottom position. A valve 122 is provided in the pipe 121. The tower can be located over dry land or can be located over water.

Figure 16:
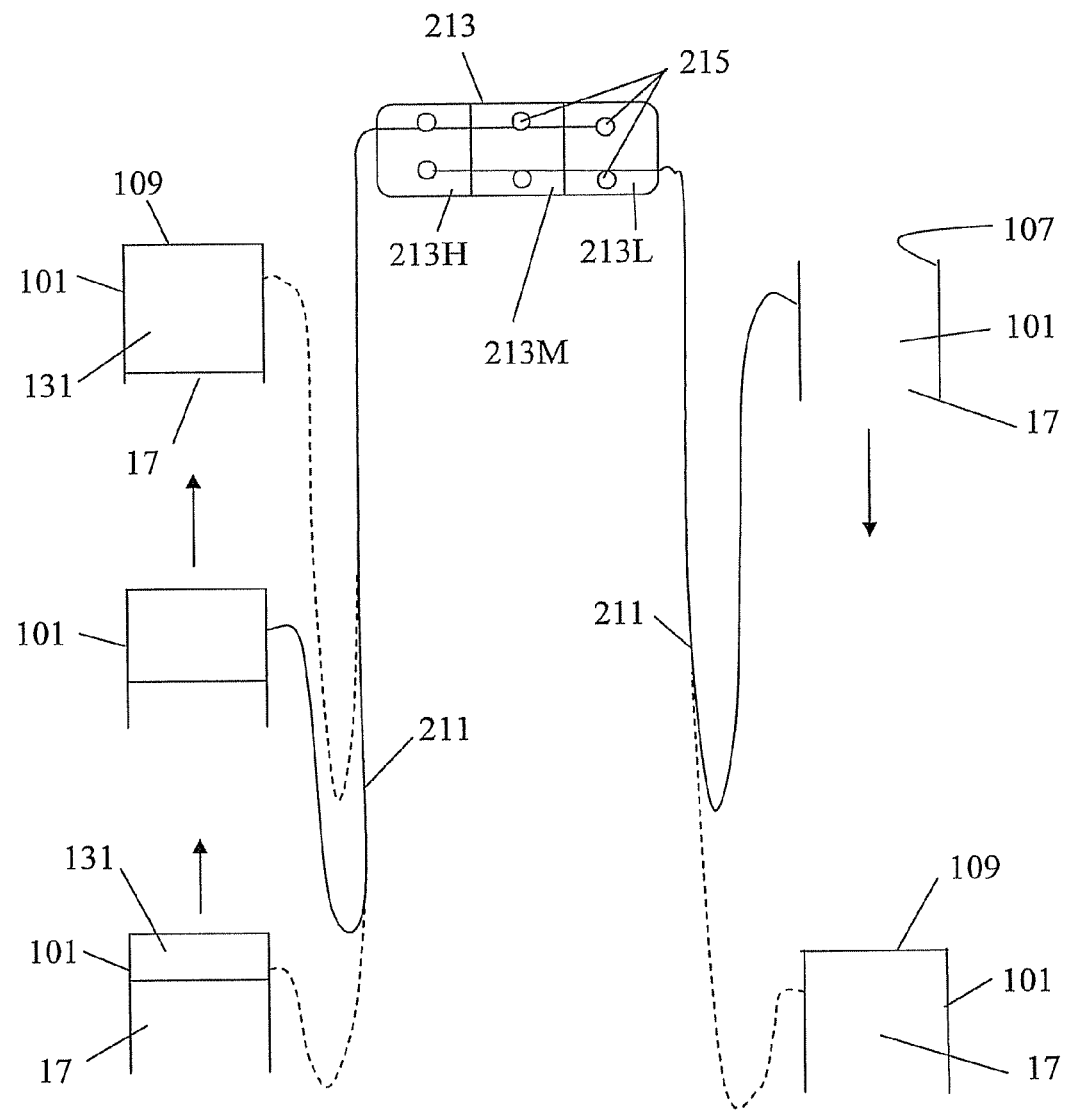
FIG. 16 shows the recapturing and reuse of gas for a rising mass container.

Gas used to increase the buoyancy of the mass 101 can be recycled or reused to minimize the energy needed to compress the gas. Referring to FIG. 16, there are shown two masses that operate in opposite directions. As one mass descends, the other mass ascends.

Because the cavities 103 of the masses 101 communicate with the exterior, such as by way of an open bottom, as a mass 101 ascends or rises, the pressure on the gas is reduced due to the lower hydrostatic pressure exerted by the surrounding water 17. Thus, the gas in the mass expands as the mass rises. This is shown on the left hand side of FIG. 16. As the mass is in its lowermost position, the gas 131 occupies a small volume of the mass interior. As the mass 101 ascends, the volume of gas expands as shown by the container in the middle position. As the mass rises to the top position, the volume of gas expands filling much of the mass interior and expelling or displacing the water 17 inside of the mass interior.

As the volume of the gas expands some of the gas can be recaptured. Recaptured gas flows into a hose 211 that is connected to the mass 101. The hose 211 is also connected to a recapture tank 213.

The recapture tank 213 has several compartments, each of which holds pressurized gas. In the embodiment shown, there are three compartments, one compartment 213H for high pressure gas, one compartment 213M for medium pressure gas and another compartment 213L for low pressure gas. Valves 215 are provided in each compartment for the hose of the respective mass. The gas will flow from a higher pressure to a lower pressure.

In operation, as the first mass is at its bottommost position and begins it ascent, the gas contained therein is at its highest pressure. This is because the mass is at its deepest location and is subjected to the greatest hydrostatic pressure. During the ascent, some of this high pressure gas is bled off into the hose 211 and to the high pressure compartment 213H of the tank 213 by way of an open valve. The rate the gas is bled is coordinated with the ascent of the mass and the expansion of the gas so that the mass continues to rise. As the mass continues to ascend, the gas loses some pressure, wherein the mass is in the medium depths, and the gas pressure is no longer high, but is medium pressure. Thus, the gas bleeds out from the mass and is routed to the medium pressure compartment 213M by operating the appropriate valves 215. Likewise, as the mass is in the shallow depths, the gas pressure is lower and the bleed off gas is routed to the lower pressure compartment 213L by the appropriate valves.

The other mass, shown on the right side of FIG. 16, is descending and has negative buoyancy, so gas is not needed. However, when the other mass reaches the bottommost position, it needs gas to achieve positive buoyancy. If the source of gas is the atmosphere, then the atmosphere gas is compressed to the pressure needed for the depth of the bottommost position. However, the tank 213 contains pressurized gas. By using the gas in the tank, less energy is required to pressurize the gas to make positively buoyant the mass in the bottommost position. The low pressure gas can be drawn from first, followed by the medium pressure gas and then the high pressure gas. If any additional gas is required to give the mass positive buoyancy, then the recaptured gas can be supplemented by other gas sources 121, 122, 124, 133, 231.

The system of FIG. 16 can be used to recapture and reuse the gas for purposes other than the masses. If the gas is natural gas provided by a well, then rather than venting the gas to the atmosphere, the gas can be captured by the hose 211 and tank 213 arrangement. Once captured, the natural gas can be used for ordinary combustion purposes, such as heating, electrical power generation, etc.

Figure 17:
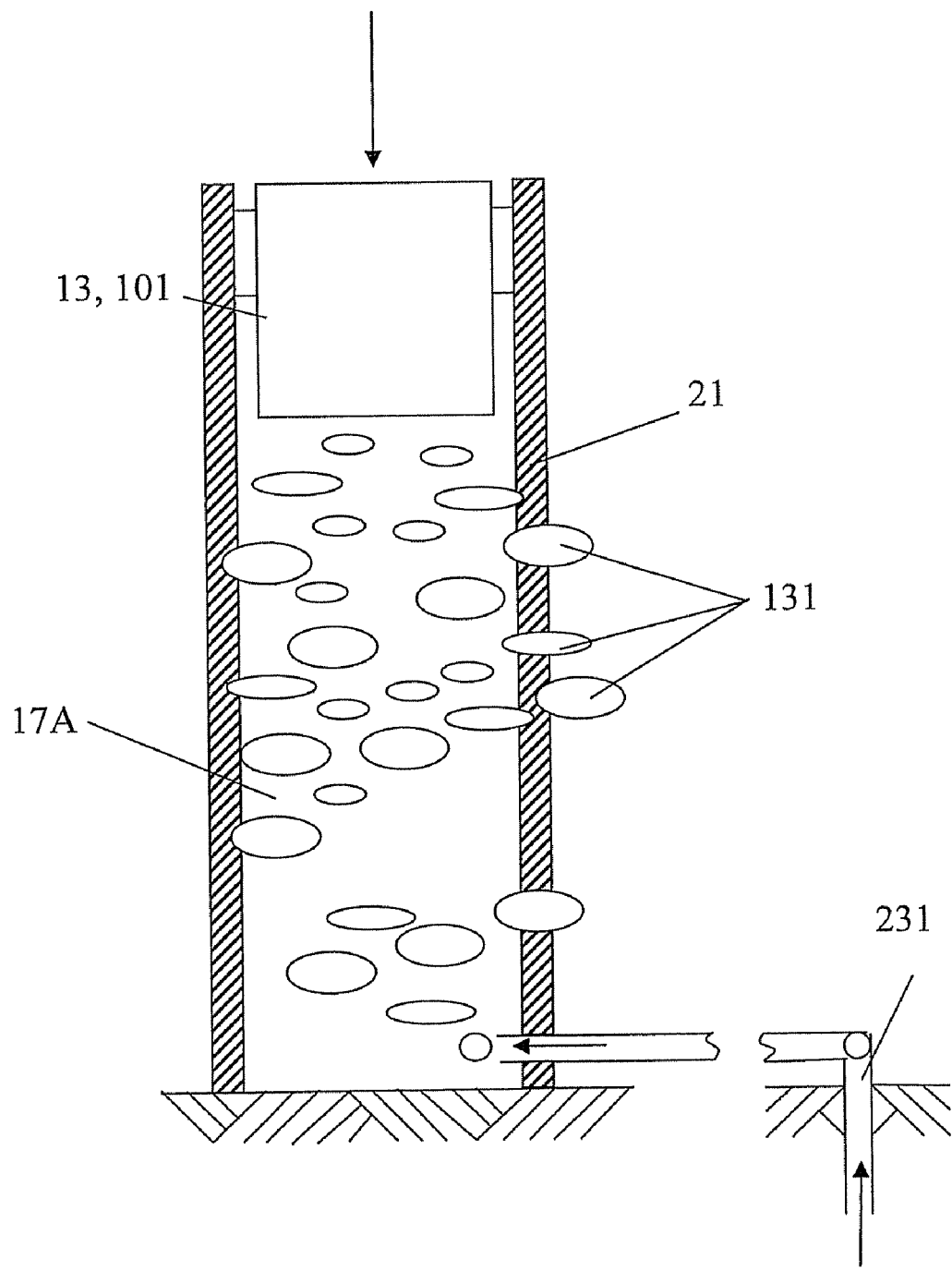
FIG. 17 shows the use of gas bubbles to lower the density of liquid and allow a mass to fall.

FIG. 17 shows the system in accordance with another embodiment. The mass 13 has a closed bottom. The top of the mass is also closed. The mass has some displacement. The mass can be a vessel hull. The mass 13 is free to rise and fall in the column of liquid. The mass has positive buoyancy relative to the liquid 17. The mass 13 is made to rise and fall by varying the density of the liquid 17 supporting the mass. The density of the liquid 17 can be lowered by providing gas 131 in the liquid. For example, a natural gas well 231 produces pressurized gas. Other gas sources can be used. For example, subsea vents can be used. These vents spew fluid containing both liquid and gas. The gas is provided at the bottom of the water column and allowed to bubble up to the surface. Large quantities of gas 131 are used to lower the density of the liquid 17 supporting the mass 103. This creates a liquid-gas region below the mass 13. The mass has negative buoyancy relative to this liquid-gas. The mass sinks in the water-gas column, moving the spiral shaft and producing power.

When the mass is at the bottommost position, the gas is shut off. The mass is now buoyant and rises to the surface, moving the spiral shaft and producing power. In FIG. 17, the spiral shaft 21, or other type of linear-to-rotary converter, is used. The buoyancy of the mass 101 is designed so as to sink when gas is bubbled up in the liquid 17 beneath the mass and to rise when the flow of gas 131 stops and the mass is located in a column of liquid 17.

Figure 18:
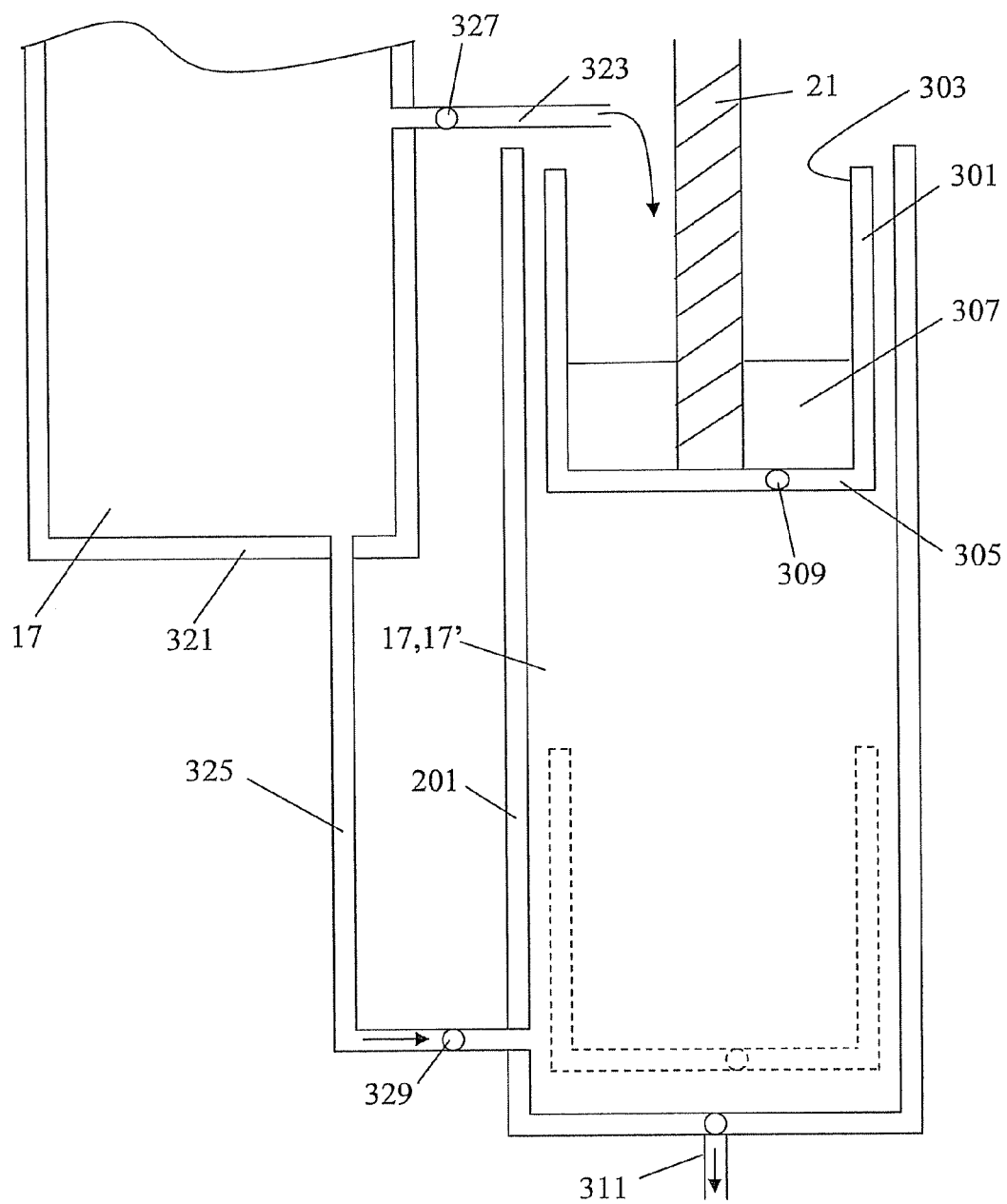
FIG. 18 shows a cross-sectional view of the system in accordance with another embodiment.

FIG. 18 shows another embodiment of the system. The mass 301 is inverted, having an open top end 303 and a closed bottom end 305. The mass also has an interior cavity 307. The bottom of the mass 301 has a valved drain 309. The mass is free to traverse up and down in a tower 201. A spiral shaft 21 is coupled to the mass 301, which spiral shaft moves with respect to a generator as described above. In FIG. 18, the generator is not shown. The tower 201 has a closed bottom and may have an open top. The tower has a bottom drain 311, with a valve therein.

A water reservoir 321 is provided separate from the tower 201. The water reservoir 321 contains water or some other liquid and has a mass inlet 323, which inlet directs water into the cavity 307 of the mass 301, when the mass is at its topmost position. The water reservoir 321 also has a tower inlet 325, which inlet directs water into the interior of the tower 201. Valves 327 and 329 control the water flow through the respective outlets. These two tower inlets 323, 325 could be consolidated into a single inlet, with a mechanism for diverting flow between the mass interior and the tower interior.

In one example, the water reservoir 321 could be a reservoir created by a dam, with the exit or drain 311 downstream of the dam. The drain 311 could drain into a harborage 61.

In operation, with the mass 301 in its topmost position, as shown in FIG. 18, water from the reservoir 321 flows into the mass cavity 307 by way of the mass inlet 323. The tower 201 has little or no water so as to produce a low water level therein. Air 17' from the atmosphere now occupies the tower interior. The mass is now very heavy and descends in the tower. As the mass descends, it moves the spiral shaft 21 down and produces power. When the mass reaches the bottommost position (shown by dashed lines), the drain valve 309 in the mass opens and the water in the mass cavity 307 drains into the tower interior. The water in the tower can either drain through the tower drain 311 or remain in the tower. The mass drain 309 then closes. The reservoir 321 now provides water to the tower; but not to the mass interior. This is done through the tower inlet 325. The mass can float and as the water level of the tower rises, the mass also rises. The vertical movement of the mass 301 moves the spiral shaft 21 and produces power. Because the top of the mass 301 is open, the rate of flow of water into the tower interior is such that the mass rises, with no water overtopping the mass side walls and entering the mass interior. Alternatively, the top of the mass can be closed with a hose feeding water into the mass interior.

The water for the water reservoir 321 can be provided from a variety of sources. If located near a dam, the water body upstream of the dam can be the water reservoir, while the tower drain can empty to the river channel below the dam. Another water source is multi-storing buildings. These buildings, such as commercial office buildings, or residential apartments or condominiums, produce waste water, such as grey water. Such waste water comes from sinks, water fountains, etc. Sewage with solids could be used if the solids are filtered out.

The foregoing disclosure and showings made in the drawings are merely illustrative of the principles of this invention and are not to be interpreted in a limiting sense.

The invention claimed is:
1. A power generator, comprising:
 a) a mass that is capable of moving vertically up and down, with gravity causing the mass to move vertically down and buoyancy in a liquid causing the mass to move vertically up;
 b) a generator having a rotor and a stator;
 c) a shaft having a spiral along a length of the shaft, the mass moves relative to one of the shaft and the generator, the vertical movement of the mass causing the spiral of the shaft to impart rotational movement to the rotor, the shaft being directly connected to the rotor without gears.

2. The power generator of claim 1 wherein the mass floats on a body of water, which body of water has a fluctuating water level.

3. The power generator of claim 2 wherein the body of water is tidal.

4. The power generator of claim 2 wherein the body of water is contained in a lock.

5. The power generator of claim 2 wherein the mass moves up and down on waves.

6. The power generator of claim 1 further comprising a harborage located in a body of water, with the mass located in the harborage.

7. The power generator of claim 6 wherein the harborage has at least one port for allowing water to ingress and egress the harborage, the port having a valve for controlling the flow of water into and out of the harborage.

8. The power generator of claim 1 wherein the generator rotor is rotated as the shaft moves in one direction.

9. The power generator of claim 1 wherein the generator rotor is rotated as the shaft moves in both directions.

10. The power generator of claim 1 wherein the shaft has spirals of constant pitch.

11. The power generator of claim 1 wherein the shaft has a first portion and end portions where the mass changes vertical direction, the shaft end portions having spirals of decreased pitch.

12. The power generator of claim 1 further comprising a flywheel rotated as the shaft moves longitudinally, the flywheel rotating the generator rotor.

13. The power generator of claim 1 wherein the mass and the shaft move in translation relative to the generator.

14. The power generator of claim 1 wherein the mass and the generator move in translation relative to the shaft.

15. The power generator of claim 1 wherein the mass moves in translation relative to the shaft and the generator.

16. The power generator of claim 1, wherein the mass does not rotate with respect to the shaft.

17. The power generator of claim 12, further comprising a reversing gear, wherein the shaft is engaged with the flywheel as the mass moves along the shaft in a first direction with the flywheel rotating in a third direction, and as the mass moves along the shaft in a second direction opposite to the first, the shaft is engaged with the flywheel by way of the reversing gear, the reversing gear causing the flywheel to rotate in the third direction.

18. A power generator, comprising:
    a) a mass that is capable of moving vertically up and down, with gravity causing the mass to move vertically down and buoyancy in a liquid causing the mass to move vertically up;
    b) a generator having a rotor and a stator;
    c) a shaft having a spiral along a length of the shaft, the mass moves relative to one of the shaft and the generator, the vertical movement of the mass causing the spiral of the shaft to impart rotational movement to the rotor;
    d) a transmission that engages the shaft and generator rotor.

19. The power generator of claim 18, wherein the mass floats on a tidal body of water.

20. The power generator of claim 18, wherein the mass floats on body of water in a lock.

21. The power generator of claim 18 wherein the mass floats on a body of water in a harborage, the harborage having at least one port for allowing water to ingress and egress the harborage, the port having a valve for controlling the flow of water into and out of the harborage.

22. A power generator, comprising:
    a) a mass that is capable of moving vertically up and down, the mass being located over land, with gravity causing the mass to move vertically down when power is to be generated;
    b) a generator having a rotor and a stator;
    c) a shaft having a spiral along a length of the shaft, the mass moves relative to one of the shaft and the generator, the vertical movement of the mass causing the spiral of the shaft to impart rotational movement to the rotor.

\* \* \* \* \*